(12) United States Patent
Unno

(10) Patent No.: US 9,104,658 B2
(45) Date of Patent: Aug. 11, 2015

(54) ELECTRONIC DICTIONARY AND RECORDING MEDIUM TO RECORD DICTIONARY INFORMATION DISPLAY CONTROL PROGRAM

(75) Inventor: Shunsuke Unno, Koto-ku (JP)

(73) Assignee: Casio Computer Co., Ltd, Tokyo (JP)

( * ) Notice: Subject to any disclaimer, the term of this patent is extended or adjusted under 35 U.S.C. 154(b) by 425 days.

(21) Appl. No.: 12/891,907

(22) Filed: Sep. 28, 2010

(65) Prior Publication Data

US 2011/0078179 A1    Mar. 31, 2011

(30) Foreign Application Priority Data

Sep. 30, 2009   (JP) .................. 2009-225736

(51) Int. Cl.
G06F 7/00 (2006.01)
G06F 17/30 (2006.01)
G06F 17/27 (2006.01)

(52) U.S. Cl.
CPC ................ G06F 17/2735 (2013.01)

(58) Field of Classification Search
USPC ...................................... 704/7–10
See application file for complete search history.

(56) References Cited

U.S. PATENT DOCUMENTS

| 5,557,794 | A  | * | 9/1996  | Matsunaga et al. ............... 1/1 |
| 5,742,505 | A  | * | 4/1998  | Fushimoto et al. ............ 704/2 |
| 8,312,032 | B2 | * | 11/2012 | Choi et al. .................... 707/758 |
| 2004/0153311 | A1 | * | 8/2004 | Liu et al. ..................... 704/10 |
| 2011/0035207 | A1 | * | 2/2011 | Abe ............................ 704/2 |

FOREIGN PATENT DOCUMENTS

| JP | 5-61914 | 3/1993 |
| JP | 05-067146 | 3/1993 |
| JP | 2008-176620 | 7/2008 |
| KR | 1020090058410 A | 6/2009 |
| KR | 1020090064342 A | 6/2009 |
| TW | 200919226 | 5/2009 |

OTHER PUBLICATIONS

Japanese Office Action for Japanese Patent Application No. 2009-225736 mailed on Jul. 12, 2011.
Korean Office Action for Korean Application No. 10-2010-0095134 mailed on May 23, 2012.
Taiwanese Office Action for Taiwanese Patent Application No. 099133021 mailed on Oct. 2, 2013.

* cited by examiner

Primary Examiner — Uyen Le
(74) Attorney, Agent, or Firm — Amin, Turocy & Watson, LLP

(57) ABSTRACT

An electronic dictionary including: a dictionary storage unit to store dictionary information in which headwords and explanation information are correlated, respectively; an input unit; a CPU to retrieve a headword corresponding to the search string inputted by the input unit from the dictionary storage unit, display the headword in a headword list, read, from the dictionary storage unit, explanation information of a headword selected from the list, and display the explanation information; and a keyword registration unit to register an inputted keyword correlated with the headword whose explanation information is displayed, wherein the CPU retrieves a headword correlated with a keyword corresponding to the search string from the keyword registration unit when the search string is inputted by the input unit in a state where the keyword correlated with the headword is registered in the keyword registration unit, and adds the headword to the headword list to display the headword.

6 Claims, 16 Drawing Sheets

FIG. 3

PART (a)

| HEADWORD | EXPLANATION INFORMATION |
|---|---|
| ⋮ | ⋮ |
| whatever | 1. [interrogative] いったい何を… |
| ⋮ | ⋮ |

820a

PART (b)

| LARGE CATEGORY | MEDIUM CATEGORY | SMALL CATEGORY | EXPLANATION INFORMATION |
|---|---|---|---|
| coming-of-age | ... | ... | ... |
|  | ... | ... | ... |
| ⋮ | ⋮ | ⋮ | ⋮ |
| manner | basic rules of etiquette | 姿勢について | ... |
|  |  | ⋮ | ⋮ |
|  | Manner of speech | ... | ... |
|  | ⋮ |  |  |

820d

PART (c)

| TITLE | HEADWORD | SMALL CATEGORY | KEYWORD | LANGUAGE TYPE | COMMENT |
|---|---|---|---|---|---|
| english to japanese dictionary | have | —— | eat | english | ... |
| english to japanese dictionary | have | —— | つかむ | japanese | ... |
| ceremonial occasion encyclopedia | —— | 姿勢について | しせい | japanese | ... |
| ⋮ | ⋮ | ⋮ | ⋮ | ⋮ | ⋮ |

PART (A)

CEREMONIAL OCCASION ENCYCLOPEDIA ###

CATEGORY ?
[A] coming-of-age [B] wedding
[C] funeral [D] other ceremonial occasions
[E] manner PART (b)

CEREMONIAL OCCASION ENCYCLOPEDIA ###

[A] 姿勢について
[B] おじぎの仕方
[C] 立ち方
[D] 障子やふすまの開け方
・・・・・・・・・・・・・・・・・・・・・

PART (c)

CEREMONIAL OCCASION ENCYCLOPEDIA ###

◇姿勢について

| PREVIOUS | PHASE | EXPLANATION OF WORD USE | KEYWORD REGISTRATION |
| NEXT | REGISTRATION IN VOCABULARY NOTEBOOK | MEMORIZATION CARD CREATION | |

PART (d)

CEREMONIAL OCCASION ENCYCLOPEDIA ###

◇姿勢について

ENGLISH KEY [ ]
JAPANESE KEY [ ]

| KEYWORD INPUT | COMMENT INPUT |

PART (e)

CEREMONIAL OCCASION ENCYCLOPEDIA ###

◇姿勢について

ENGLISH KEY [ ]
JAPANESE KEY [ しせい ]

| しせい | | い |
| ← → | | |
| REWRITE | | |

ELECTRONIC DICTIONARY AND RECORDING MEDIUM TO RECORD DICTIONARY INFORMATION DISPLAY CONTROL PROGRAM

BACKGROUND OF THE INVENTION

1. Field of the Invention

The present invention relates to an electronic dictionary and a recording medium to record a dictionary information display control program.

2. Description of the Related Art

Conventionally, an electronic dictionary having a dictionary function includes a dictionary database which stores headwords and explanation information of the headwords being correlated with each other, respectively. The electronic dictionary is structured to read the explanation information of a headword from the dictionary database, the headword which corresponds to an inputted word, and to display the headword and the explanation information on a display.

Currently, in such an electronic dictionary, a keyword is attached to a headword by a user, and the headword can be retrieved by using the keyword, accordingly.

However, since a headword is retrieved by using an attached keyword by the above-mentioned art, unless a user remembers what keyword is attached to the headword, the headword cannot be retrieved by using the keyword. As a result, a problem arises that retrieval thereof is performed inefficiently.

SUMMARY OF THE INVENTION

The present invention is made in view of the circumstances, and there is provided an electronic dictionary which can efficiently retrieve explanation information of a headword to which a keyword is attached, and a recording medium to record a program for efficiently retrieving explanation information of a headword to which a keyword is attached.

To solve the problem mentioned above, a first aspect of the present invention is an electronic dictionary including: a dictionary storage unit to store dictionary information in which a plurality of headwords and a plurality of explanation information are correlated with each other, respectively; an input unit to input a search string based on a user operation; a headword list display control unit to retrieve at least one headword from the dictionary storage unit, the at least one headword corresponding to the search string inputted by the input unit, and to display the at least one retrieved headword in a headword list; an explanation information display control unit to read explanation information from the dictionary storage unit, the explanation information which is for a headword selected based on a user operation from among the at least one retrieved headword in the headword list displayed by the headword list display control unit, and to display the read explanation information; and a keyword registration unit to register a keyword which is inputted based on a user operation and the headword whose explanation information is displayed by the explanation information display control unit, the keyword and the headword being correlated with each other, wherein the headword list display control unit includes a keyword-addition-to-headword unit to retrieve a headword correlated with a keyword corresponding to the search string and registered in the keyword registration unit from among at least one headword registered in the keyword registration unit when the search string is inputted by the input unit in a state where the keyword is correlated with the headword and registered in the keyword registration unit, and to add the retrieved headword correlated with the keyword corresponding to the inputted search string and registered in the keyword registration unit to the headword list so as to display the retrieved headword correlated with the keyword corresponding to the inputted search string and registered in the keyword registration unit.

A second aspect of the present invention is a recording medium to record a dictionary information display control program for a computer including a dictionary storage unit to store dictionary information in which a plurality of headwords and a plurality of explanation information are correlated with each other, respectively, to display the dictionary information, the recording medium making the computer function as: an input unit to input a search string based on a user operation; a headword list display control unit to retrieve at least one headword from the dictionary storage unit, the at least one headword corresponding to the search string inputted by the input unit, and to display the at least one retrieved headword in a headword list; an explanation information display control unit to read explanation information from the dictionary storage unit, the explanation information which is for a headword selected based on a user operation from among the at least one retrieved headword in the headword list displayed by the headword list display control unit, and to display the read explanation information; and a keyword registration unit to register a keyword which is inputted based on a user operation and the headword whose explanation information is displayed by the explanation information display control unit, the keyword and the headword being correlated with each other, wherein the headword list display control unit includes a keyword-addition-to-headword unit to retrieve a headword correlated with a keyword corresponding to the search string inputted by the input unit and registered in the keyword registration unit from among at least one headword registered in the keyword registration unit when the search string is inputted by the input unit in a state where the keyword is correlated with the headword and registered in the keyword registration unit, and to add the retrieved headword correlated with the keyword corresponding to the inputted search string and registered in the keyword registration unit to the headword list so as to display the retrieved headword correlated with the keyword corresponding to the inputted search string and registered in the keyword registration unit.

According to the aspects of the present invention, when at least one headword corresponding to an inputted search string is retrieved from the dictionary storage unit, the at least one retrieved headword is displayed in a headword list. Then, a headword is selected from among the at least one retrieved headword in the headword list based on a user operation, and the explanation information of the selected headword is read from the dictionary information and displayed. When a keyword inputted based on a user operation is registered in the keyword registration unit, the keyword being correlated with the headword whose explanation information is displayed, and the search string is inputted thereafter, the headword correlated with the keyword which corresponds to the search string and registered in the keyword registration unit is retrieved from at least one headword registered in the keyword registration unit, and added to the headword list so as to be displayed. Accordingly, even when what keyword is attached to what headword is not remembered, a keyword corresponding to a search string is detected, a headword correlated with the keyword and registered in the keyword registration unit is retrieved, and the retrieved headword is added to a headwork list so as to be displayed. Consequently, retrieval of a headword to which a keyword is attached can be performed in addition to the standard headword retrieval without being aware that a keyword is attached to a retrieval-target headword. Accordingly, retrieval of a headword to which a user attaches a keyword can be performed efficiently.

BRIEF DESCRIPTION OF THE DRAWINGS

FIG. 3 shows a data structure of a dictionary database in PART (a), a data structure of an encyclopedia database in PART (b), and a data structure of a keyword registration table in PART (c);

FIG. 13 shows display contents of the display unit;

DETAILED DESCRIPTION OF THE INVENTION

[External Appearance]

Figure 1:
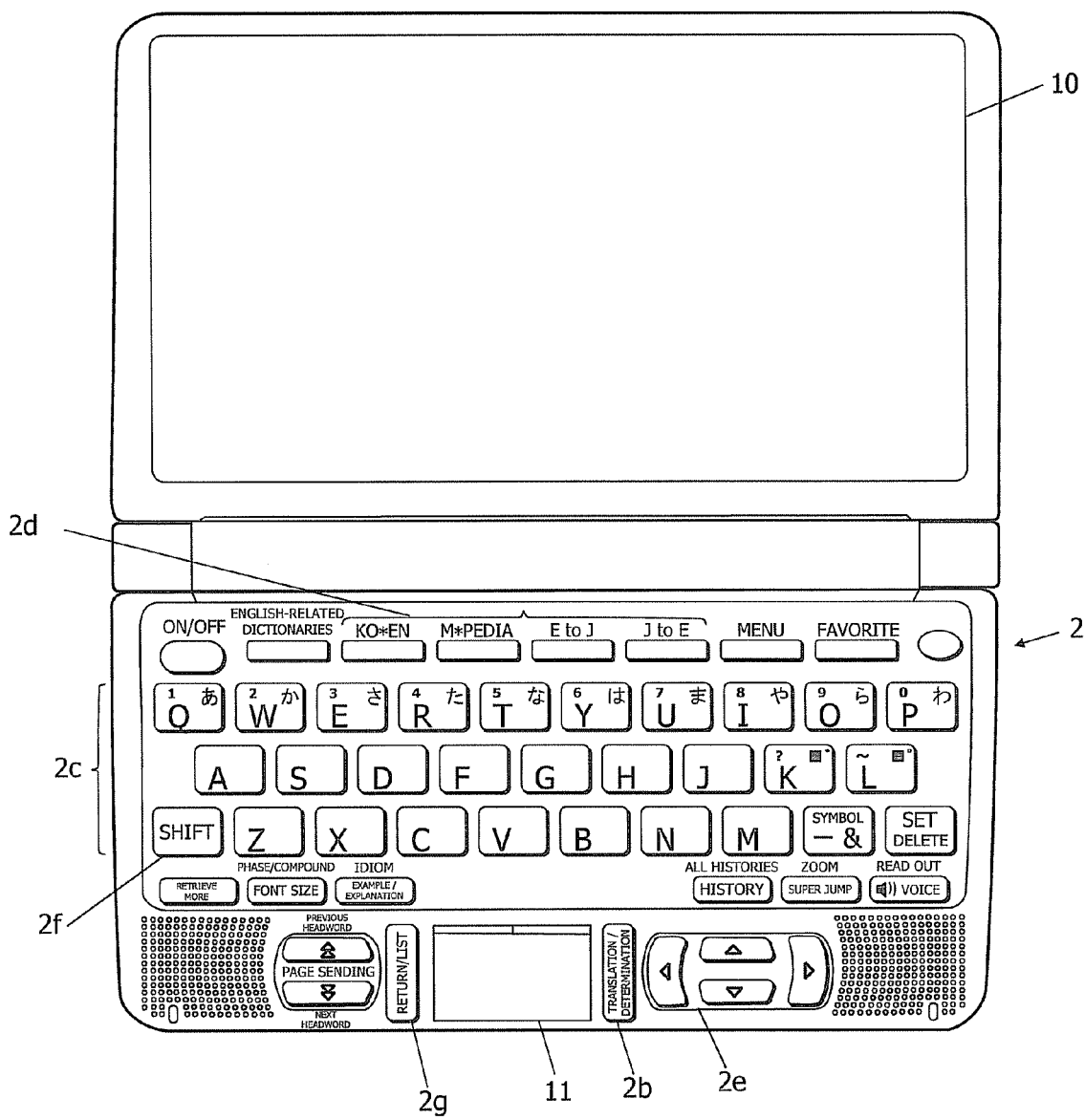
FIG. 1 is a plane view showing an external appearance of an electronic dictionary.

FIG. 1 is a plane view of an electronic dictionary 1.

As shown in FIG. 1, the electronic dictionary 1 includes a main-display 10, a sub-display 11, and a key set 2.

The main-display 10 and the sub-display 11 display various data such as letters and symbols based on user operations of the key set 2, and are composed of a liquid crystal display (LCD), an electronic luminescent display (ELD), or the like, respectively. The main-display 10 and the sub-display 11 according to an embodiment of the present invention are integrated with a touch panel 110 (shown in FIG. 2), so that by depressing a surface of the touch panel 110, an input operation according to a depressed position on the touch panel 110 becomes available.

The key set 2 includes various keys for a user to operate the electronic dictionary 1. More specifically, the key set 2 includes a translation/determination key 2b, letter keys 2c, dictionary selection keys 2d, cursor keys 2e, a shift key 2f, and a return/list key 2g.

The translation/determination key 2b is used for execution of retrieval, determination of a headword, and the like. The letter keys 2c are used for inputting a word by a user, and the like. The letter keys 2c according to the embodiment of the present invention include keys A to Z. The dictionary selection keys 2d are used for selecting a dictionary (or encyclopedia) database 820 (shown in FIG. 2) described below.

The cursor keys 2e are used for moving a reverse display position in a screen, namely, a cursor position in the screen, and the like. In the embodiment of the present invention, the cursor keys 2e can specify a direction to move the position, namely, to move up, down, left or right. The shift key 2f is used when a Japanese word is set as a retrieval target, and the like. The return/list key 2g is used for returning to a screen previously displayed, and the like.

[Internal Structure]

Figure 2:
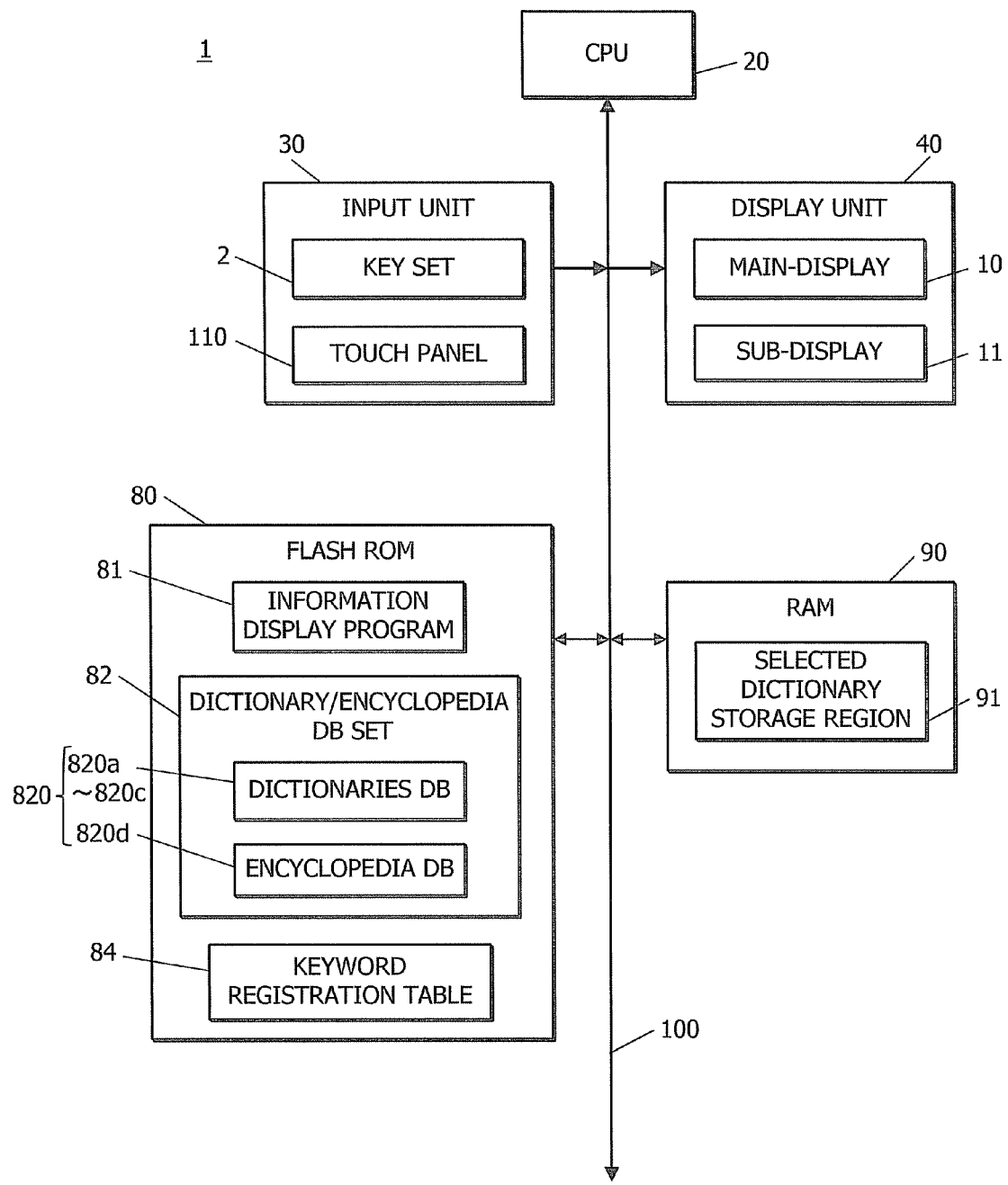
FIG. 2 is a block diagram showing an internal structure of the electronic dictionary.

Next, the internal structure of the electronic dictionary 1 is described. FIG. 2 is a block diagram showing the internal structure of the electronic dictionary 1.

As shown in FIG. 2, the electronic dictionary 1 includes a display unit 40, an input unit 30, a central processing unit (CPU) 20, a flash read only memory (ROM) 80, and a random access memory (RAM) 90. The units and the like are connected with each other through a bus 100 so as to have data communications with each other.

The display unit 40 includes the main-display 10 and the sub-display 11, which are mentioned above, and displays various information on the main-display 10 and the sub-display 11 based on display signals inputted from the CPU 20.

The input unit 30 includes the key set 2 and the touch panel 110, which are mentioned above, and outputs a signal to the CPU 20, the signal corresponding to a key, which is depressed, of the key set 2 or a depressed position on the touch panel 110.

The CPU 20 performs processing based on a prescribed program according to an inputted instruction, and transfers the instruction and/or data to each unit, and the like, so as to control the electronic dictionary 1 as a whole. More specifically, the CPU 20 reads each program stored in the flash ROM 80 in response to each operation signal and the like inputted from the input unit 30, and performs processing according to the read program. Then, the CPU 20 stores the result of the processing in the RAM 90, and appropriately outputs the result of the processing to the display unit 40.

The flash ROM 80 is a memory to store programs and data for executing various functions of the electronic dictionary 1. In the embodiment of the present invention, the flash ROM stores an information display program 81, a dictionary/encyclopedia database set 82, a keyword registration table 84, and the like.

The information display program 81 is a program in the present invention, and allows the CPU 20 to perform dictionary/encyclopedia retrieval processing (shown in FIG. 5) described below.

The dictionary/encyclopedia database set 82 includes a plurality of databases 820. In the embodiment of the present invention, the dictionary/encyclopedia database set 82 includes a dictionary database 820a of an English to Japanese dictionary, a dictionary database 820b of "Ko*en" (Japanese dictionary), a dictionary database 820c of "Mei* Japanese Dictionary", and an encyclopedia database 820d of a ceremonial occasion encyclopedia.

As shown in PART (a) of FIG. 3, a plurality of headwords, a plurality of explanation information, and the like are stored in each of the dictionary databases 820a to 820c. The plurality of headwords, the plurality of explanation information, and the like are correlated with each other, respectively, therein. Explanation information is composed of the meaning content of a headword.

A plurality of categories, a plurality of explanation information, and the like are stored in the encyclopedia database 820d. The plurality of categories, the plurality of explanation information, and the like are correlated with each other, respectively, therein. As shown in PART (b) of FIG. 3, the data structure of the encyclopedia database 820d according to the embodiment of the present invention is a hierarchy structure. The categories are divided into large categories, medium categories, and small categories. A plurality of medium categories is included in the content of each large category, a plurality of small categories is included in the content of each medium category, and each small category is correlated with its explanation information.

As shown in PART (c) of FIG. 3, the keyword registration table 84 accumulates and stores titles of the dictionary (or encyclopedia) databases 820, headwords (or small categories) stored in the databases 820, keywords and comments inputted by a user, and language types of the keywords, all of which are correlated with each other, respectively, in keyword registration processing (shown in FIG. 8) described below.

The RAM 90 includes a memory region to temporality store various programs which the CPU 20 executes and data and the like for executing the programs. In the embodiment of the present invention, the RAM 90 includes a selected dictionary storage region 91.

In the selected dictionary storage region 91, the title of a dictionary (or encyclopedia) database 820 selected by a user as a search area for a headword is stored.

[Operation]

Next, operation of the electronic dictionary 1 is described.

FIGS. 4 to 8 are flow charts showing the sequence of steps of the dictionary/encyclopedia retrieval processing which the CPU 20 performs by reading the information display program 81.

Figure 8:
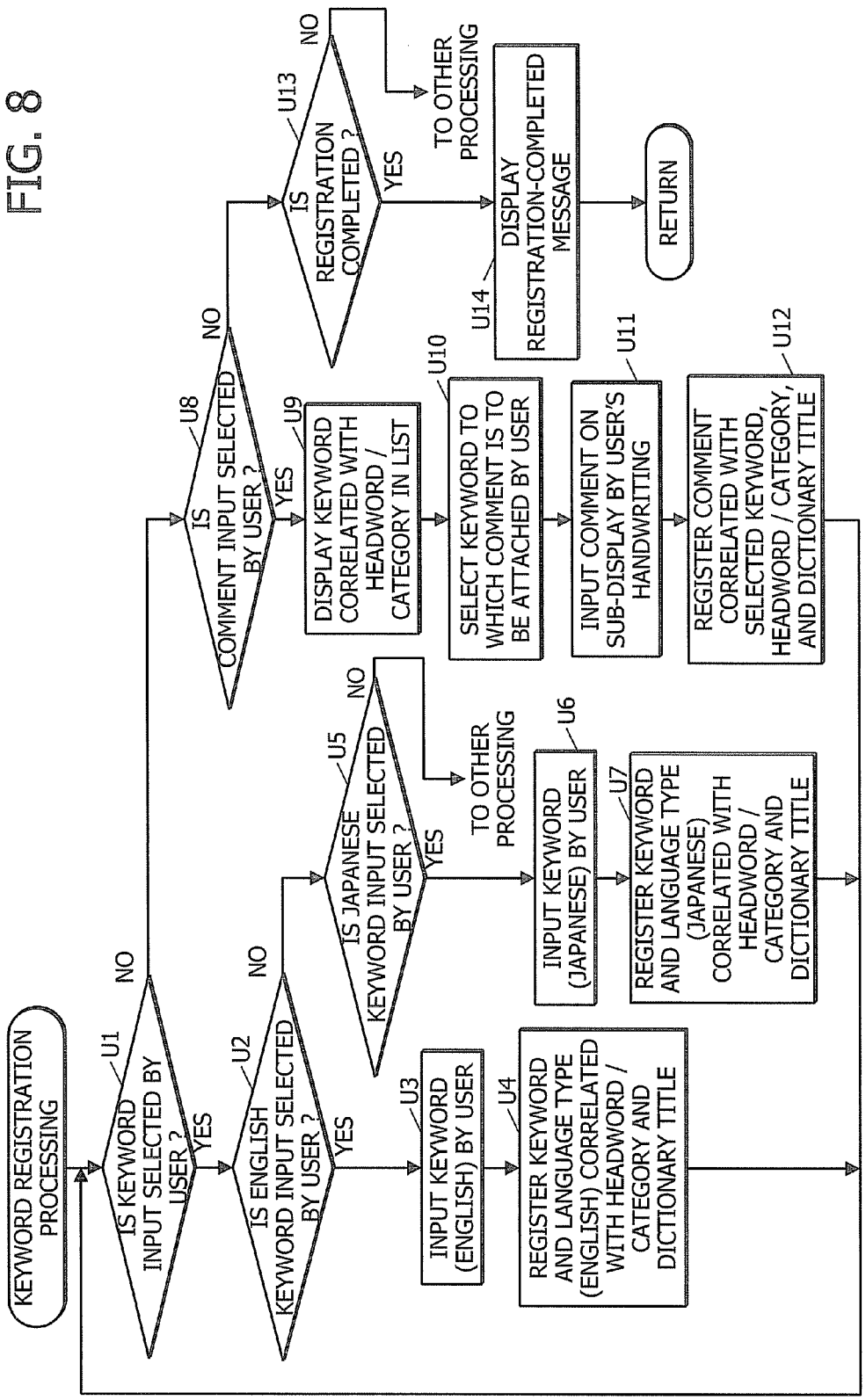
FIG. 8 is a flow chart showing keyword registration processing.
Figure 9:
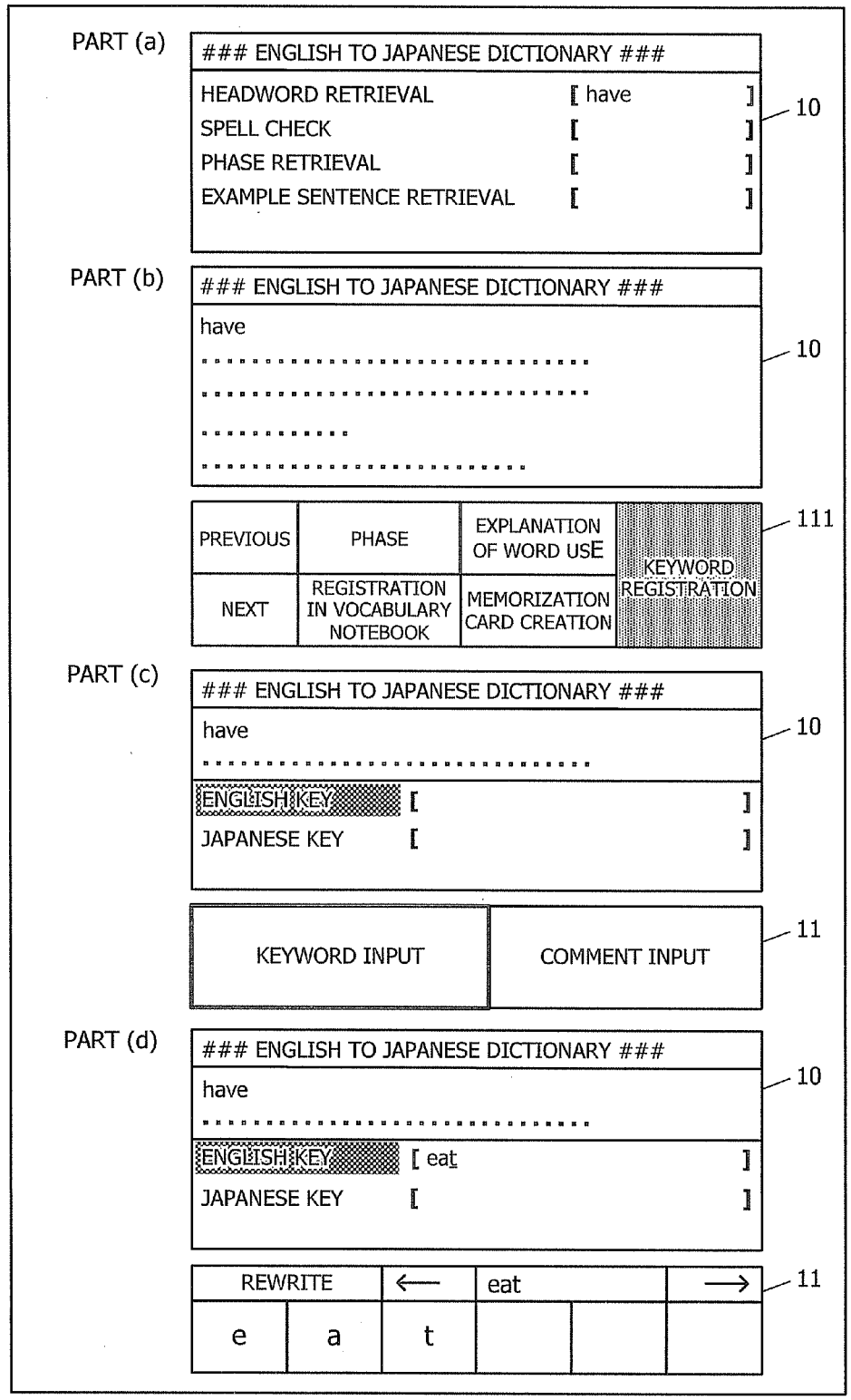
FIG. 9 shows display contents of a display unit.

In the dictionary/encyclopedia retrieval processing, when the explanation information of a headword (or small category) is retrieved from a database 820 which is a search area, and displayed, a keyword registration button 111 (shown in PART (b) of FIG. 9) for instructing registration of a keyword or a comment with the headword (or small category) is displayed on the sub-display 11. When a user operation for registering a keyword or a comment is performed through the keyword registration button 111, the keyword registration processing shown in FIG. 8 is performed. (Refer to Step T15 of FIG. 5, Step V15 of FIG. 6, and Step W11 of FIG. 7.) The detail of the dictionary/encyclopedia retrieval processing is described below.

In the following, first, the keyword registration processing is described, and the dictionary/encyclopedia retrieval processing is described thereafter, for convenience.

[Keyword Registration Processing]

FIG. 8 shows a flow chart showing the sequence of steps of the keyword registration processing as a sub-routine of the dictionary/encyclopedia retrieval processing.

As shown in FIG. 8, when the keyword registration processing is performed by the user operation for registering a keyword or a comment, the CPU 20, first, displays a keyword input button 112 for instructing a start of a keyword input and a comment input button 113 for instructing a start of a comment input on the sub-display 11 (shown in PART (c) of FIG. 9). Then, the CPU 20 judges whether a keyword input is selected by the user or not (Step U1). At the time, the CPU 20 divides a display region of the main-display 10 into two display areas. One of the display areas keeps displaying the explanation information of a headword (or small category), the explanation information which is displayed, and the other of the display areas displays an input frame for inputting an English keyword and an input frame for inputting a Japanese keyword.

When the CPU 20 judges that the keyword input is selected at Step U1 (Step U1; YES), the CPU 20 judges whether an English keyword input is selected or not based on whether the input frame for inputting an English keyword is selected or not (Step U2).

When the CPU 20 judges that the English keyword input is selected at Step U2 (Step U2; YES), the CPU accepts an input of an English keyword into the selected input frame from the user (Step U3). In the embodiment of the present invention, the keyword may be inputted by operating the key set 2 or by handwriting on the touch panel 110 of the sub-display 11.

Next, the CPU 20 correlates the inputted keyword and its language type (in this case, English) with the title of the dictionary (or encyclopedia) database 820 which is the search area at the time and the headword (or small category) whose explanation information is displayed, registers the inputted keyword and its language type correlated with the title of the dictionary (or encyclopedia) database 820 and the headword (or small category) in the keyword registration table 84 (Step U4), and then moves to Step U1 described above.

When the CPU 20 judges that the English keyword input is not selected at Step U2 (Step U2; NO), the CPU 20 judges whether a Japanese keyword input is selected or not based on whether the input frame for inputting a Japanese keyword is selected or not (Step U5).

When the CPU 20 judges that the Japanese keyword input is not selected at Step U5 (Step U5; NO), the CPU 20 moves to other processing.

When the CPU 20 judges that the Japanese keyword input is selected at Step U5 (Step U5; YES), the CPU accepts an input of a Japanese keyword into the selected input frame from the user (Step U6). In the embodiment of the present invention, the keyword may be inputted by operating the key set 2 or by handwriting on the touch panel 110 of the sub-display 11.

Next, the CPU 20 correlates the inputted keyword and its language type (in this case, Japanese) with the title of the dictionary (or encyclopedia) database 820 which is the search area at the time and the headword (or small category) whose explanation information is displayed, registers the inputted keyword and its language type correlated with the title of the dictionary (or encyclopedia) database 820 and the headword (or small category) in the keyword registration table 84 (Step U7), and then moves to Step U1 described above.

When the CPU 20 judges that the keyword input is not selected at Step U1 (Step U1; NO), the CPU 20 judges whether a comment input is selected by the user or not (Step U8).

When the CPU 20 judges that the comment input is selected at Step U8 (Step U8; YES), the CPU 20 displays at least one keyword on the main-display in a list form (Step U9), the keyword being correlated with the headword (or small category) whose explanation information is displayed, and being registered in the keyword registration table 84.

When the user selects a keyword to which a comment is to be attached (Step U10), and the comment to be attached is inputted (Step U11), the CPU 20 correlates the inputted comment with the selected keyword, the title of the dictionary (or encyclopedia) database 820 which is the search area at the time, and the headword (or small category) whose explanation information is displayed, and registers the inputted comment correlated with the selected keyword, the title of the dictionary (or encyclopedia) database 820, and the headword (or small category) in the keyword registration table 84 (Step U12). In the embodiment of the present invention, the comment may be inputted by operating the key set 2 or by handwriting on the touch panel 110 of the sub-display 11.

When the CPU 20 judges that the comment input is not selected at Step U8 (Step U8; NO), the CPU 20 judges whether an operation for completing registration is performed or not (Step U13). When the CPU 20 judges that the operation for completing registration is not performed at Step U13 (Step U13; NO), the CPU 20 moves to other processing.

When the CPU 20 judges that the operation for completing registration is performed at Step U13 (Step U13; YES), the CPU displays a registration-completed message on the main-display 10 (Step U14), and ends the keyword registration processing thereafter.

In the above-described keyword registration processing according to the embodiment of the present invention, a plurality of keywords and comments can be attached to one headword (or small category).

[Dictionary/Encyclopedia Retrieval Processing]

Next, the dictionary/encyclopedia retrieval processing is described referring to FIGS. 4 to 8.

Figure 4:
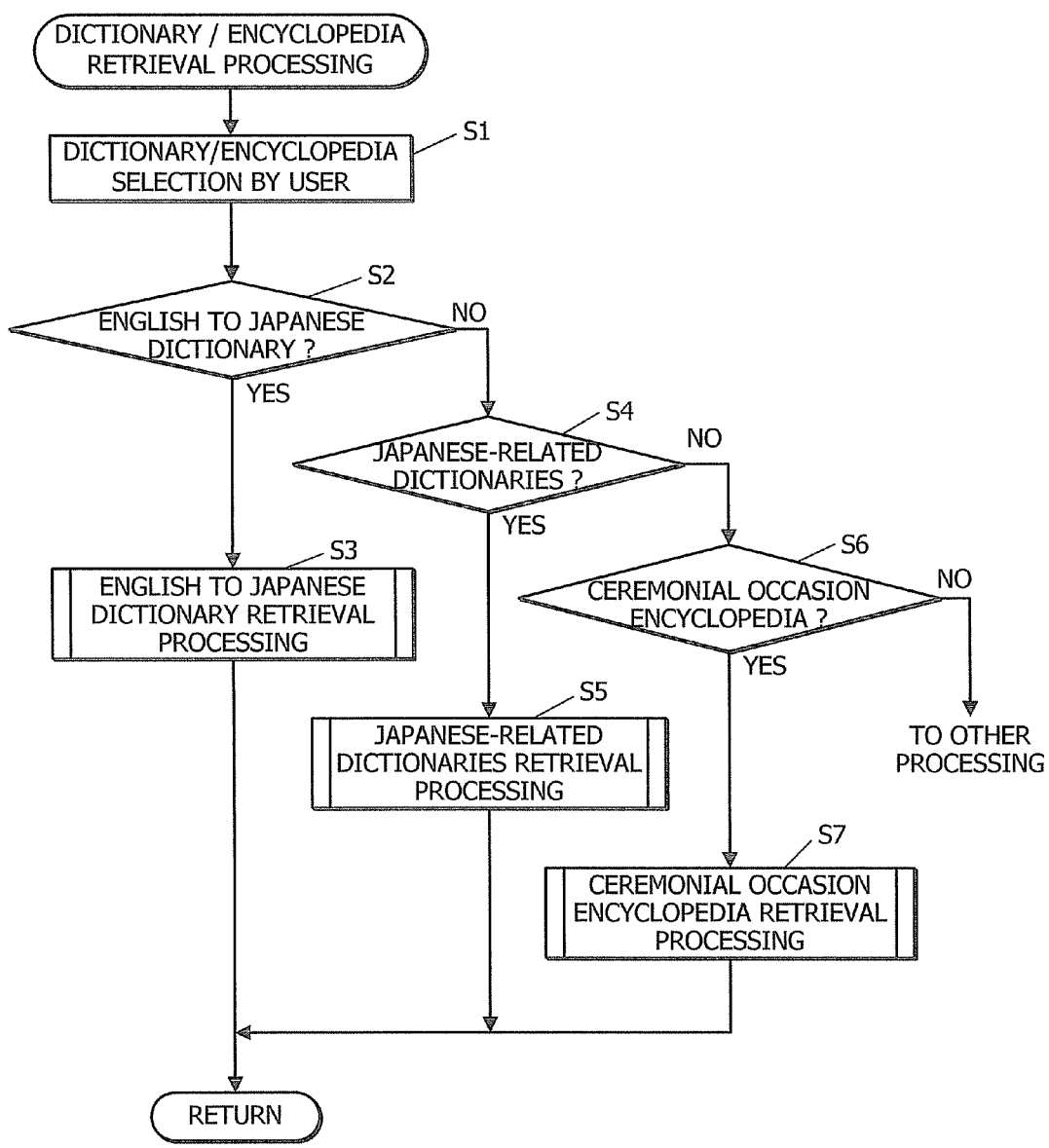
FIG. 4 is a flow chart showing dictionary/encyclopedia retrieval processing.

As shown in FIG. 4, when a user selects one of the databases 820 stored in the flash ROM 80 as a search area by one of the dictionary selection keys 2d (Step S1) after the dictionary/encyclopedia retrieval processing is performed, the CPU 20 judges whether the database 820 selected as the search area is the dictionary database 820a of the English to Japanese dictionary or not (Step S2) after storing the title of the selected database 820 in the selected dictionary storage region 91.

When the CPU 20 judges that the database 820 selected as the search area is the dictionary database 820a of the English to Japanese dictionary at Step S2 (Step S2; YES), the CPU 20 performs English to Japanese dictionary retrieval processing (Step S3).

Figure 5:
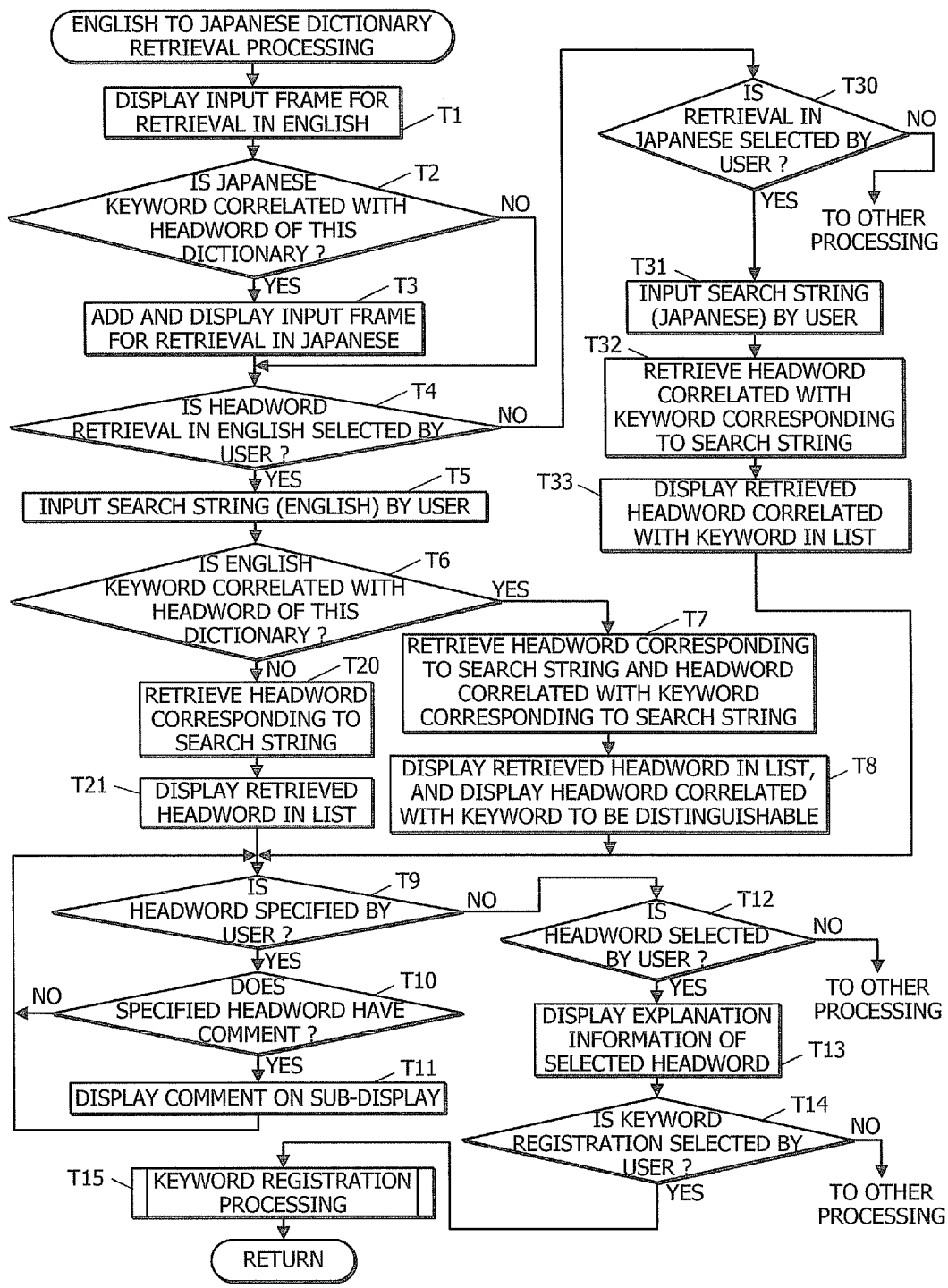
FIG. 5 is a flow chart showing English to Japanese dictionary retrieval processing.

More specifically, as shown in FIG. 5, in the English to Japanese dictionary retrieval processing, the CPU 20, first, displays an input screen for inputting a search string on the main-display 10 (Step T1). At Step T1, the CPU 20 displays an input frame in the input screen, the input frame for inputting a search string in order to retrieve a headword in a language type of the headwords stored in the dictionary database 820a of the English to Japanese dictionary, namely, English.

Next, the CPU 20 judges whether a Japanese keyword is correlated with the dictionary database 820a of the English to Japanese dictionary and registered in the keyword registration table 84 by the keyword registration processing (shown in FIG. 8) described above or not (Step T2). When the CPU 20 judges that a Japanese keyword is not correlated with the dictionary database 820a of the English to Japanese dictionary and registered in the keyword registration table 84 at Step T2 (Step T2; NO), the CPU 20 moves to Step T4 described below.

When the CPU 20 judges that a Japanese keyword is correlated with the dictionary database 820a of the English to Japanese dictionary and registered in the keyword registration table 84 at Step T2 (Step T2; YES), the CPU 20 displays an input frame in the input screen, the input frame for inputting a search string in order to retrieve a headword in a language type of Japanese (Step T3). Namely, when a keyword is registered in a language type (Japanese) which is different from the language type (English) of the headwords stored in the dictionary database 820a of the English to Japanese dictionary, an input frame for the language type (Japanese) of the keyword is displayed in the input screen.

Next, the CPU 20 judges whether headword retrieval in English is selected or not based on whether the input frame for English is selected by the user or not (Step T4).

When the CPU 20 judges that the headword retrieval in English is selected at Step T4 (Step T4; YES), the CPU accepts an input of an English search string into the selected input frame from the user (Step T5).

Next, the CPU 20 judges whether an English keyword is correlated with the dictionary database 820a of the English to Japanese dictionary and registered in the keyword registration table 84 by the keyword registration processing (shown in FIG. 8) described above or not (Step T6).

When the CPU 20 judges that an English keyword is not correlated with the dictionary database 820a of the English to Japanese dictionary and registered in the keyword registration table 84 at Step T6 (Step T6; NO), the CPU 20 retrieves at least one headword corresponding to the search string, or more specifically, at least one headword which agrees with the search string in the prefix (or in the first letter at least), from the dictionary database 820a of the English to Japanese dictionary (Step T20), displays the at least one retrieved headword as a headword list on the main-display 10 (Step T21), and moves to Step T9 described below thereafter.

When the CPU 20 judges that an English keyword is correlated with the dictionary database 820a of the English to Japanese dictionary and registered in the keyword registration table 84 at Step T6 (Step T6; YES), the CPU 20 retrieves at least one headword corresponding to the search string from the dictionary database 820a of the English to Japanese dictionary and also retrieves at least one headword correlated with a keyword corresponding to the search string and registered in the keyword registration table 84 from among at least one headword registered in the keyword registration table 84 (Step T7).

Next, the CPU 20 displays the at least one retrieved headword as a headword list on the main-display 10 (Step T8), and moves to Step T9 described below. More specifically, at Step T8, the CPU 20 displays, among the at least one headword retrieved from the dictionary database 820a of the English to Japanese dictionary, a headword which completely agrees with the search string at the top of the headword list, and displays the headword retrieved from the keyword registration table 84 immediately under the headword which completely agrees with the search string in the headword list. At the time, the CPU 20 displays the headword retrieved from the keyword registration table 84 so as to be distinguishable in the headword list. In the embodiment of the present invention, the CPU 20 displays the headword retrieved from the keyword registration table 84 so as to be distinguishable by changing a display color thereof or a line width thereof, but another way can be used therefor.

When the CPU 20 judges that the headword retrieval in English is not selected at Step T4 (Step T4; NO), the CPU judges whether headword retrieval in Japanese is selected or not based on whether the input frame for Japanese is selected by the user or not (Step T30).

When the CPU judges that the headword retrieval in Japanese is not selected at Step T30 (Step T30; NO), the CPU 20 moves to other processing.

When the CPU judges that the headword retrieval in Japanese is selected at Step T30 (Step T30; YES), the CPU accepts an input of a Japanese search string into the selected input frame from the user (Step T31).

Next, the CPU 20 retrieves at least one headword correlated with a keyword corresponding to the search string (in this case, Japanese search string) and registered in the keyword registration table 84 from among at least one headword registered in the keyword registration table 84 (Step T32).

The CPU 20 displays the retrieved headword on the main-display 10 as a headword list (Step T33).

Then, the CPU 20 judges whether a headword of the at least one headword in the headword list is specified (temporarily selected) by the user through the cursor keys 2e or not (Step T9).

When the CPU 20 judges that a headword of the headword in the headword list is specified at Step T9 (Step T9; YES), the CPU 20 judges whether a comment is correlated with the specified headword and registered in the keyword registration table 84 or not (Step T10). When the CPU 20 judges that a comment is not correlated with the specified headword and registered in the keyword registration table 84 at Step T10 (Step T10; NO), the CPU 20 moves to Step T9 described above.

When the CPU 20 judges that a comment is correlated with the specified headword and registered in the keyword registration table 84 at Step T10 (Step T10; YES), the CPU 20 displays the comment on the sub-display 11 (Step T11), and moves to Step T9 described above thereafter.

When the CPU 20 judges that a headword of the at least one headword in the headword list is not specified at Step T9 (Step T9; NO), the CPU 20 judges whether a headword is selected from the at least one headword in the headword list by the user through the cursor keys 2e and the translation/determination key 2b or not (Step T12).

When the CPU 20 judges that a headword is not selected from the headword in the headword list at Step T12 (Step T12; NO), the CPU 20 moves to other processing.

When the CPU 20 judges that a headword is selected from the headword in the headword list at Step T12 (Step T12; YES), the CPU 20 reads the explanation information of the selected headword from the dictionary database 820a of the English to Japanese dictionary, and displays the read explanation information on the main-display 10 (Step T13). At the time, the CPU 20 displays the keyword registration button 111 on the sub-display 11.

Next, the CPU 20 judges whether the operation for registering a keyword or a comment is performed by the user or not based on whether the keyword registration button 111 is operated or not (Step T14). When the CPU 20 judges that the operation for registering a keyword or a comment is not performed at Step T14 (Step T14; NO), the CPU 20 moves to other processing.

When the CPU 20 judges that the operation for registering a keyword or a comment is performed at Step T14 (Step T14; YES), the CPU 20 performs the keyword registration processing (shown in FIG. 8) described above (Step T15). Consequently, a keyword or a comment is correlated with a retrieved headword, and registered in the keyword registration table 84.

When the keyword registration processing is completed, the CPU 20 ends the English to Japanese dictionary retrieval processing and the dictionary/encyclopedia retrieval processing, as shown in FIGS. 4 and 5.

As shown in FIG. 4, when the CPU 20 judges that the database 820 selected as the search area is not the dictionary database 820a of the English to Japanese dictionary at Step S2 (Step S2; NO), the CPU 20 judges whether the database 820 selected as the search area is Japanese-related dictionaries or not (Step S4). When the Japanese-related dictionaries is selected as the search area, Japanese-related dictionaries such as the dictionary database 820b of "Ko*en" (Japanese dictionary), the dictionary database 820c of "Mei* Japanese Dictionary", a Japanese to English dictionary, an encyclopedia, and other dictionaries with which at least one Japanese word is correlated (the ceremonial occasion encyclopedia in the embodiment of the present invention), all of which are retrievable in Japanese, are the search area.

When the CPU 20 judges that the databases 820 selected as the search area is the Japanese-related dictionaries which are retrievable in Japanese (Step S4; YES), the CPU 20 performs the Japanese-related dictionaries retrieval processing (Step S5).

Figure 6:
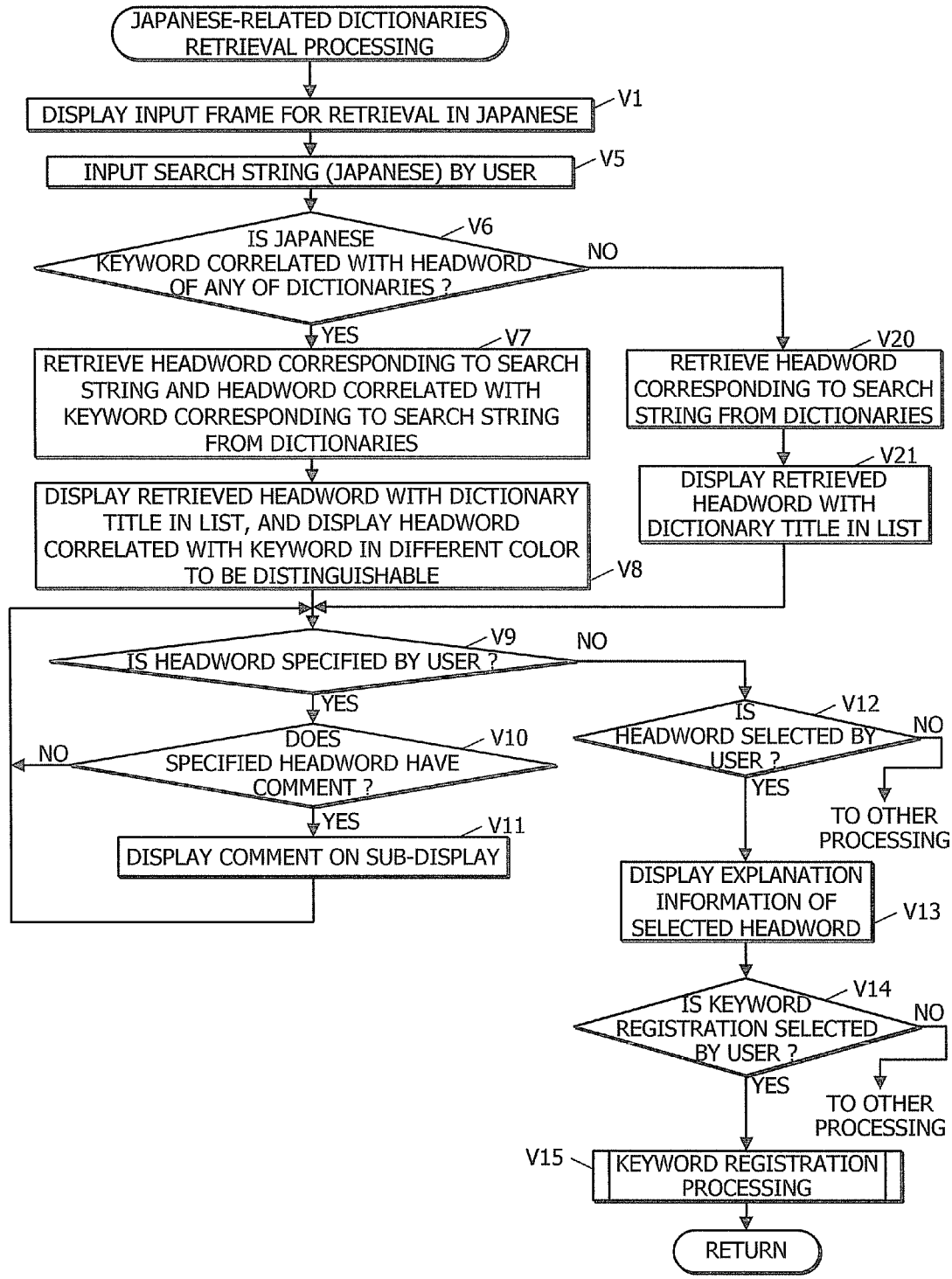
FIG. 6 is a flow chart showing Japanese-related dictionaries retrieval processing.

More specifically, as shown in FIG. 6, in the Japanese-related dictionaries retrieval processing, the CPU 20, first, displays an input screen for inputting a search string on the main-display 10 (Step V1). At Step V1, the CPU 20 displays an input frame in the input screen, the input frame for inputting a search string in order to retrieve a headword in a language type of headwords stored in Japanese-related dictionaries such as the databases 820b and 820c of the Japanese dictionaries, namely, Japanese.

Next, the CPU 20 accepts an input of a Japanese search string into the selected input frame from the user (Step V5).

Then, the CPU 20 judges whether a Japanese keyword is correlated with a database 820 of the databases 820 of the dictionary/encyclopedia database set 82 and registered in the keyword registration table 84 by the keyword registration processing (shown in FIG. 8) described above or not (Step V6).

When the CPU 20 judges that a Japanese keyword is not correlated with a database 820 of the databases 820 of the dictionary/encyclopedia database set 82 and registered in the keyword registration table 84 at Step V6 (Step V6; NO), the CPU 20 retrieves at least one headword corresponding to the search string from the Japanese-related dictionaries (Step V20), displays the at least one retrieved headword as a headword list on the main-display 10 (Step V21), and moves to Step V9 described below thereafter. At Step V21, the CPU 20 correlates the title of a dictionary database 820 with a headword in the headword list, the dictionary database 820 from which the headword is retrieved, and displays the title thereof correlated with the headword on the main-display 10, with regard to each headword in the headword list.

When the CPU 20 judges that a Japanese keyword is correlated with a database 820 of the databases 820 of the dictionary/encyclopedia database set 82 and registered in the keyword registration table 84 at Step V6 (Step V6; YES), the CPU 20 retrieves at least one headword corresponding to the search string from the Japanese-related dictionaries such as the dictionary databases 820b and 820c of the Japanese dictionaries, and also retrieves at least one headword and/or small category which is correlated with a keyword corresponding to the search string and registered in the keyword registration table 84 from among at least one headword and/or small category registered in the keyword registration table 84 (Step V7).

Next, the CPU 20 displays the retrieved headwords and/or small categories as the headword list on the main-display 10 (Step V8). More specifically, at Step V8, the CPU 20 correlates the headword retrieved from the databases 820 of the Japanese-related dictionaries with the title of a database 820 from which the headword is retrieved, and also correlates the headword and/or small category retrieved from the keyword registration table 84 with the title of a dictionary and/or encyclopedia which is correlated with the retrieved headword and/or small category and which is registered in the keyword registration table 84, so as to display the retrieved headwords and/or small categories with the titles on the main-display 10. The CPU 20 displays, among the headword retrieved from the Japanese-related dictionaries such as the dictionary databases 820b and 820c of the Japanese dictionaries, a headword which completely agrees with the search string at the top of the headword list, and displays the headword and/or small category retrieved from the keyword registration table 84 immediately under the headword which completely agrees with the search string in the headword list. At the time, the CPU 20 displays the headword and/or small category retrieved from the keyword registration table 84 so as to be distinguishable in the headword list. In the embodiment of the present invention, the CPU 20 displays the headword and/or small category retrieved from the keyword registration table 84 so as to be distinguishable by changing a display color thereof or a line width thereof, but another way can be used therefor.

Next, the CPU 20 judges whether a headword or small category of the headword and small category in the headword list is specified (temporarily selected) by the user through the cursor keys 2e or not (Step V9).

When the CPU 20 judges that a headword or small category of the headword and small category in the headword list is specified at Step V9 (Step V9; YES), the CPU 20 judges whether a comment is correlated with the specified headword or small category and registered in the keyword registration table 84 or not (Step V10). When the CPU 20 judges that a comment is not correlated with the specified headword or small category and registered in the keyword registration table 84 at Step V10 (Step V10; NO), the CPU 20 moves to the Step V9 described above.

When the CPU 20 judges that a comment is correlated with the specified headword or small category and registered in the keyword registration table 84 at Step V10 (Step V10; YES), the CPU 20 displays the comment on the sub-display 11 (Step V11), and moves to Step V9 described above thereafter.

When the CPU 20 judges that a headword or small category of the headword and small category in the headword list is not specified at Step V9 (Step V9; NO), the CPU 20 judges whether a headword or small category is selected from the headword and small category in the headword list by the user through the cursor keys 2e and the translation/determination key 2b or not (Step V12).

When the CPU 20 judges that a headword or small category is not selected from the headword and small category in the headword list at Step V12 (Step V12; NO), the CPU 20 moves to other processing.

When the CPU 20 judges that a headword or small category is selected from the headword and/or small category in the headword list at Step V12 (Step V12; YES), the CPU 20 reads the explanation information of the selected headword or small category from the dictionary (or encyclopedia) database 820 whose title is displayed, and displays the read explanation information on the main-display 10 (Step V13). At the time, the CPU 20 displays the keyword registration button 111 on the sub-display 11.

Next, the CPU 20 judges whether the operation for registering a keyword or a comment is performed by the user or not based on whether the keyword registration button 111 is operated or not (Step V14). When the CPU 20 judges that the operation for registering a keyword or a comment is not performed at Step V14 (Step V14; NO), the CPU 20 moves to other processing.

When the CPU 20 judges that the operation for registering a keyword or a comment is performed at Step V14 (Step V14; YES), the CPU 20 performs the keyword registration processing (shown in FIG. 8) described above (Step V15). Consequently, a keyword or a comment is correlated with a retrieved headword or small category and registered in the keyword registration table 84.

When the keyword registration processing is completed, the CPU 20 ends the Japanese-related dictionaries retrieval processing and the dictionary/encyclopedia retrieval processing, as shown in FIGS. 4 and 6.

As shown in FIG. 4, when the CPU 20 judges that the database 820 selected as the search area is not the Japanese-related dictionaries at Step S4 (Step S4; NO), the CPU 20 judges whether the database 820 selected as the search area is the encyclopedia database 820d or not (Step S6). When the CPU 20 judges that the database 820 selected as the search area is not the encyclopedia database 820d at Step S6 (Step S6; NO), the CPU 20 moves to other processing.

When the CPU 20 judges that the database 820 selected as the search area is the encyclopedia database 820d at Step S6 (Step S6; YES), the CPU 20 performs the ceremonial occasion encyclopedia retrieval processing (Step S7).

Figure 7:
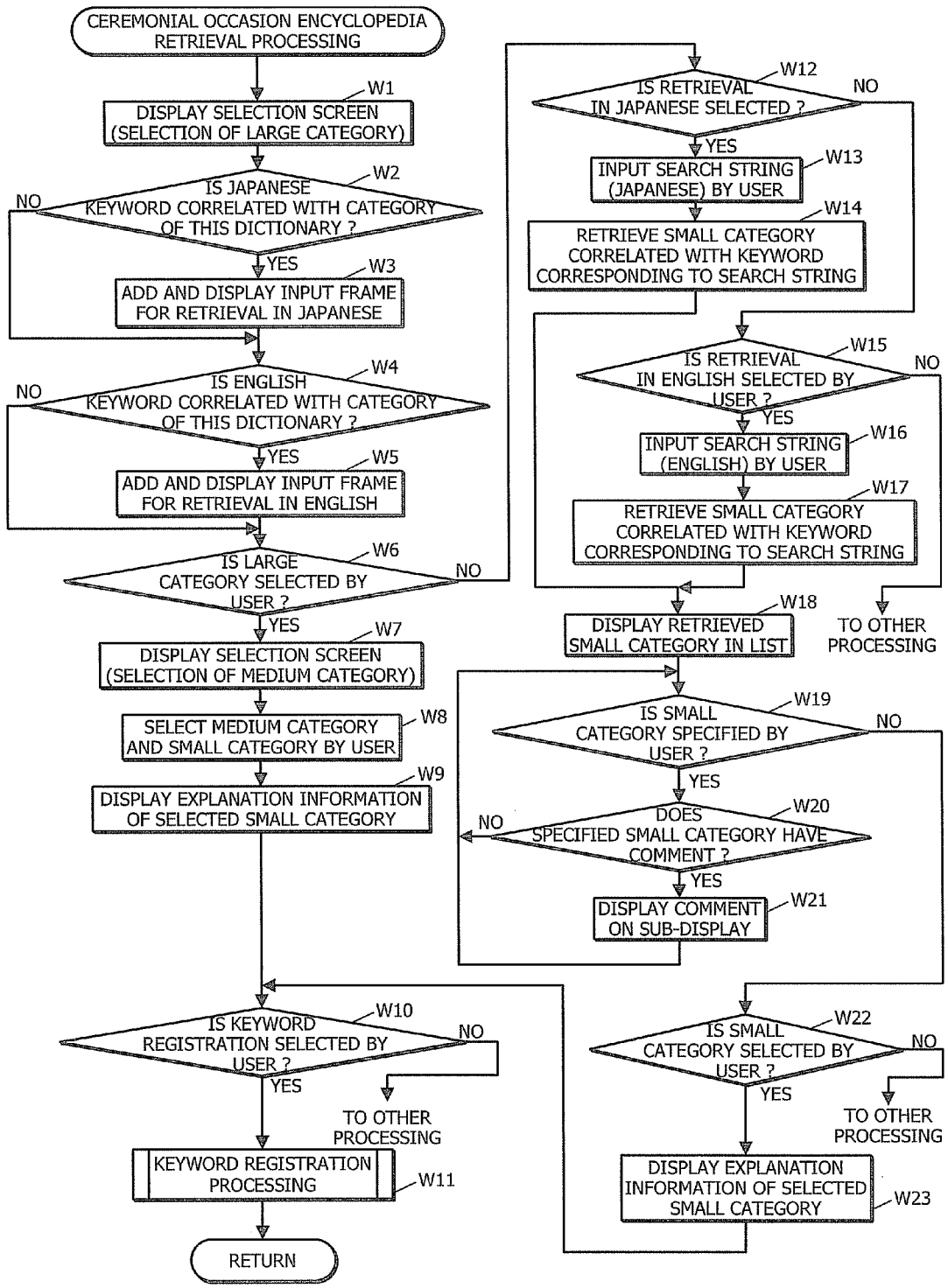
FIG. 7 is a flow chart showing ceremonial occasion encyclopedia retrieval processing.

More specifically, as shown in FIG. 7, in the ceremonial occasion encyclopedia retrieval processing, the CPU 20, first, displays a category selection screen for selecting a large category as a search area on the main-display 10 (Step W1). At Step W1, the CPU 20 displays large categories stored in the encyclopedia database 820d of the ceremonial occasion encyclopedia in a list form in the category selection screen in a state where a large category can be selected therefrom.

Next, the CPU 20 judges whether a Japanese keyword is correlated with the encyclopedia database 820d of the ceremonial occasion encyclopedia and registered in the keyword registration table 84 by the keyword registration processing (shown in FIG. 8) described above or not (Step W2). When the CPU 20 judges that a Japanese keyword is not correlated with the encyclopedia database 820d of the ceremonial occasion encyclopedia and registered in the keyword registration table 84 at Step W2 (Step W2; NO), the CPU 20 moves to Step W4 described below.

When the CPU 20 judges that a Japanese keyword is correlated with the encyclopedia database 820d of the ceremonial occasion encyclopedia and registered in the keyword registration table 84 at Step W2 (Step W2; YES), the CPU 20 displays an input frame in the category selection screen, the input frame for inputting a search string in order to retrieve a small category in a language type of Japanese (Step W3).

Next, the CPU 20 judges whether an English keyword is correlated with the encyclopedia database 820d of the ceremonial occasion encyclopedia and registered in the keyword registration table 84 by the keyword registration processing (shown in FIG. 8) described above or not (Step W4). When the CPU 20 judges that an English keyword is not correlated with the encyclopedia database 820d of the ceremonial occasion encyclopedia and registered in the keyword registration table 84 at Step W4 (Step W4; NO), the CUP 20 moves to Step W6 described below.

When the CPU 20 judges that an English keyword is correlated with the encyclopedia database 820d of the ceremonial occasion encyclopedia and registered in the keyword registration table 84 at Step W4 (Step W4; YES), the CPU 20 displays an input frame in the category selection screen, the input frame for inputting a search string in order to retrieve a small category in a language type of English (Step W5).

Next, the CPU 20 judges whether a large category is selected from the large categories by a user through the category selection screen or not (Step W6). When the CPU 20 judges that a large category is selected from the large categories at Step W6 (Step W6; YES), the CPU 20 displays medium categories of the selected large category on the main-display 10 in a list form in a state where a medium category can be selected from the medium categories (Step W7).

When a medium category is selected from the medium categories by the user, small categories of the selected medium category are displayed on the main-display 10 in a state where a small category can be selected from the small categories. When a small category is selected from the small categories by the user (Step W8), the CPU 20 reads the explanation information of the selected small category from the encyclopedia database 820d, and displays the read explanation information on the main-display 10 (Step W9). At the time, the CPU 20 displays the keyword registration button 111 on the sub-display 11.

Next, the CPU 20 judges whether the operation for registering a keyword or a comment is performed by the user or not based on whether the keyword registration button 111 is operated or not (Step W10). When the CPU 20 judges that the operation for registering a keyword or a comment is not performed at Step W10 (Step W10; NO), the CPU 20 moves to other processing.

When the CPU 20 judges that the operation for registering a keyword or a comment is performed at Step W10 (Step W10; YES), the CPU 20 performs the keyword registration processing (shown in FIG. 8) described above (Step W11). Consequently, a keyword or a comment is correlated with a retrieved small category and registered in the keyword registration table 84.

When the keyword registration processing is completed, the CPU 20 ends the ceremonial occasion encyclopedia retrieval processing and the dictionary/encyclopedia retrieval processing, as shown in FIGS. 4 and 7.

When the CPU 20 judges that a large category is not selected from the large categories at Step W6 (Step W6; NO), the CPU 20 judges whether a category retrieval in Japanese is selected or not based on whether the input frame for Japanese is selected by the user or not (Step W12).

When the CPU 20 judges that the category retrieval in Japanese is selected at Step W12 (Step W12; YES), the CPU 20 accepts an input of a Japanese search string into the selected input frame from the user (Step W13).

Next, the CPU 20 retrieves at least one small category correlated with a keyword corresponding to the search string from among at least one small category registered in the keyword registration table 84 (Step W14), and moves to Step W18 described below thereafter.

When the CPU 20 judges that the category retrieval in Japanese is not selected at Step W12 (Step W12; NO), the CPU 20 judges whether a category retrieval in English is selected or not based on whether the input frame for English is selected by the user or not (Step W15).

When the CPU 20 judges that the category retrieval in English is not selected at Step W15 (Step W15; NO), the CPU 20 moves to other processing.

When the CPU 20 judges that the category retrieval in English is selected at Step W15 (Step W15; YES), the CPU 20 accepts an input of an English search string into the selected input frame from the user (Step W16).

Next, the CPU 20 retrieves at least one small category correlated with a keyword corresponding to the search string from among the at least one small category registered in the keyword registration table 84 (Step W17).

Then, the CPU 20 displays the at least one retrieved small category on the main-display in a list form (Step W18), and judges a small category of the small category in the list is specified (temporarily selected) by the user through the cursor keys 2e or not (Step W19).

When the CPU 20 judges that a small category of the small category in the list is specified at Step W19 (Step W19; YES), the CPU 20 judges whether a comment is correlated with the specified small category and registered in the keyword registration table 84 or not (Step W20). When the CPU 20 judges that a comment is not correlated with the specified small category and registered in the keyword registration table 84 at Step W20 (Step W20; NO), the CPU 20 moves to Step W19 described above.

When the CPU 20 judges that a comment is correlated with the specified small category and registered in the keyword registration table 84 at Step W20 (Step W20; YES), the CPU 20 displays the comment on the sub-display 11 (Step W21), and moves to Step W19 described above thereafter.

When the CPU 20 judges that a small category of the small category in the list is not specified at Step W19 (Step W19; NO), the CPU 20 judges whether a small category is selected from the small category in the list by the user through the cursor keys 2e and the translation/determination key 2b or not (Step W22).

When the CPU 20 judges that a small category is not selected from the small category in the list at Step W22 (Step W22; NO), the CPU 20 moves to other processing.

When the CPU 20 judges that a small category is selected from the small category in the list at Step W22 (Step W22; YES), the CPU 20 reads the explanation information of the selected small category from the encyclopedia database 820d, displays the read explanation information on the main-display 10 (Step W23), and moves to Step W10 described above thereafter. At Step W23, the CPU 20 displays the keyword registration button 111 on the sub-display 11.

Embodiments of Operation

Next, the dictionary/encyclopedia retrieval processing is described in detail referring to FIGS. 9 to 17.

First Embodiment of Operation

First, as shown in PART (a) of FIG. 9, when a user selects the dictionary database 820a of the English to Japanese dictionary as a search area (Step S2; YES), the input screen including the input frame for inputting an English search string is displayed on the main-display 10 (Step T1).

When the user selects the input frame for inputting an English search string (Step T4; YES), and inputs an English search string "have" therein (Step T5), headwords "have" and the like corresponding to the English search string "have" are retrieved from the dictionary database 820a of the English to Japanese dictionary (Step T20) by being judged that there is no English keyword correlated with the dictionary database 820a of the English to Japanese dictionary and registered in the keyword registration table 84 (Step T6; NO). The retrieved headwords "have" and the like are displayed on the main-display 10 as a headword list (Step T21).

When the headword "have" is selected from among the headwords "have" and the like in the headword list (Step T12; YES), as shown in PART (b) of FIG. 9, the explanation information of the selected headword "have" is read from the dictionary database 820a of the English to Japanese dictionary and displayed on the main-display (Step T13). Then, the keyword registration button 111 is displayed on the sub-display 11.

When the operation for registering a keyword or a comment is performed by the user through the keyword registration button 111 (Step T14; YES), as shown in PART (c) of FIG. 9, the input frame for inputting an English keyword and the input frame for inputting a Japanese keyword are displayed on the main-display 10. In addition, the keyword input button 112 for instructing a start of inputting a keyword and the comment input button 113 for instructing a start of inputting a comment are displayed on the sub-display 11 (Step U1).

When, as shown in PART (c) and PART (d) of FIG. 9, the user selects the English keyword input (Step U1; YES, Step U2; YES), and inputs an English keyword "eat" on the touch panel 110 of the sub-display 11 by handwriting (Step U3), the inputted keyword "eat" and its language type "English" are correlated with the title "English to Japanese dictionary" of the dictionary database 820a which is the search area and the headword "have" whose explanation information is displayed, and registered in the keyword registration table 84 (Step U4), as shown in the second row of PART (c) of FIG. 3.

Figure 10:
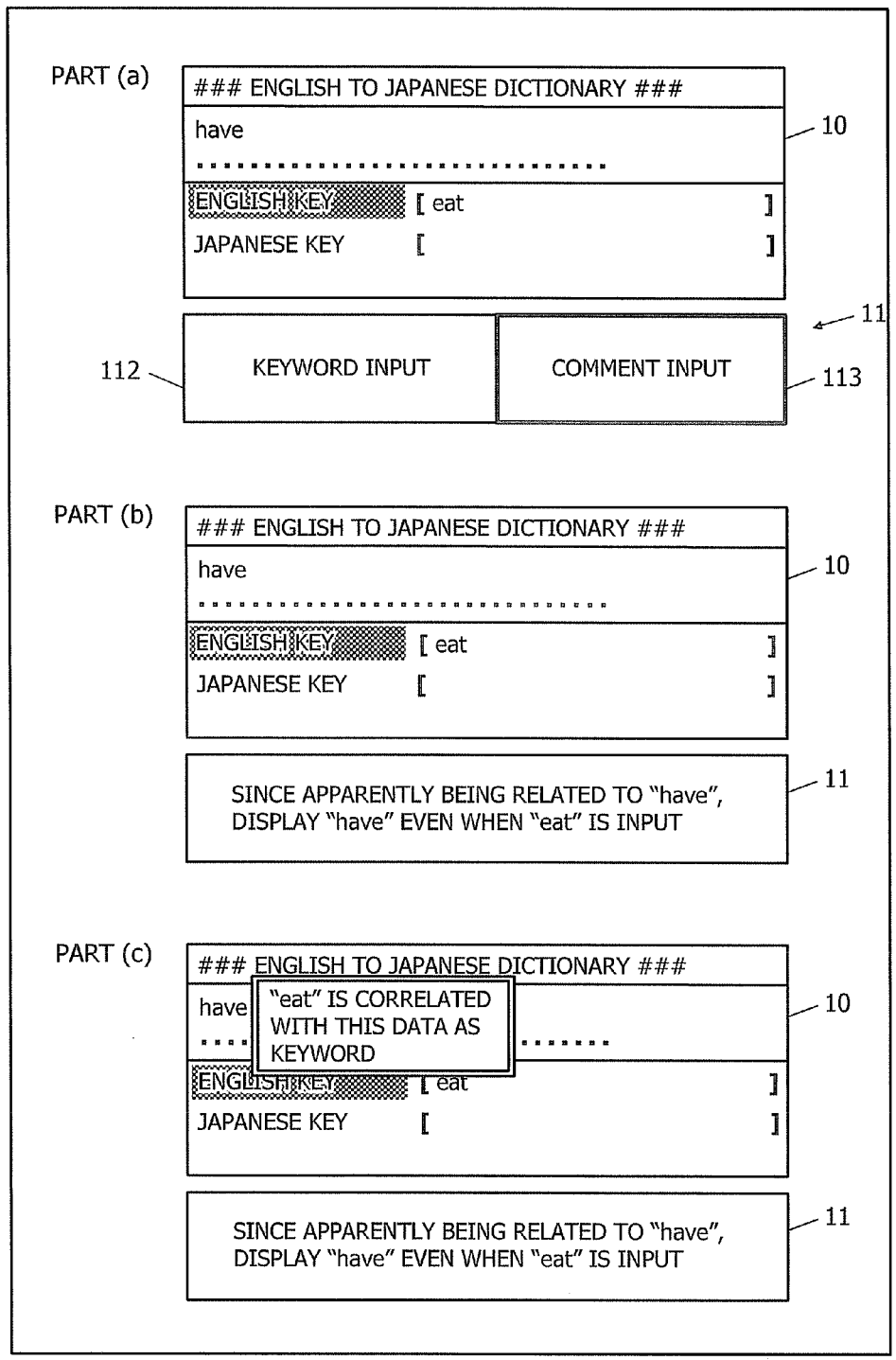
FIG. 10 shows display contents of the display unit.

When, as shown in PART (a) to PART (c) of FIG. 10, the user selects the comment input (Step U1; NO, Step U8; YES), selects a keyword "eat" from a list of keywords which are correlated with the headword "have" and registered in the keyword registration table 84, the headword "have" whose explanation information is displayed (Step U10), and inputs a comment "since apparently being related to 'have', . . . ", the comment which is to be attached, on the sub-display 11 by handwriting (Step U11), the inputted comment "since apparently being related to 'have', . . . " is correlated with the selected keyword "eat", the title "English to Japanese dictionary" of the dictionary database 820*a*, and the headword "have", and registered in the keyword registration table 84 (Step U12).

When the user selects the Japanese keyword input (Step U1; YES, Step U5; YES) and inputs a Japanese keyword "つかむ (つかむ (tsukamu))" on the touch panel 110 of the sub-display 11 by handwriting (Step U3) after the user re-selects the dictionary database 820*a* of the English to Japanese dictionary as the search area (Step S2; YES) and the explanation information of the headword "have" is displayed on the main-display 10 (Step T13) in the same way described above, the inputted keyword "つかむ (つかむ (tsukamu))" and its language type "Japanese" are correlated with the title "English to Japanese dictionary" of the dictionary database 820*a* and the headword "have", and registered in the keyword registration table 84 (Step U4).

When the user re-selects the Japanese keyword input (Step U2; YES), the input screen including the input frame for inputting an English search string is displayed on the main-display 10 (Step T1) as shown in PART (a) of FIG. 11. In addition, the input frame for inputting a Japanese search string is displayed in the input screen (Step T3) by being judged that a Japanese keyword "つかむ (つかむ (tsukamu))" is correlated with the dictionary database 820*a* of the English to Japanese dictionary and registered in the keyword registration table 84 (Step T2; YES).

When the user selects the input frame for inputting a Japanese search string, and selects the headword retrieval in Japanese (Step T30; YES), a Japanese search string can be inputted into the selected input frame (Step T31).

Figure 11:
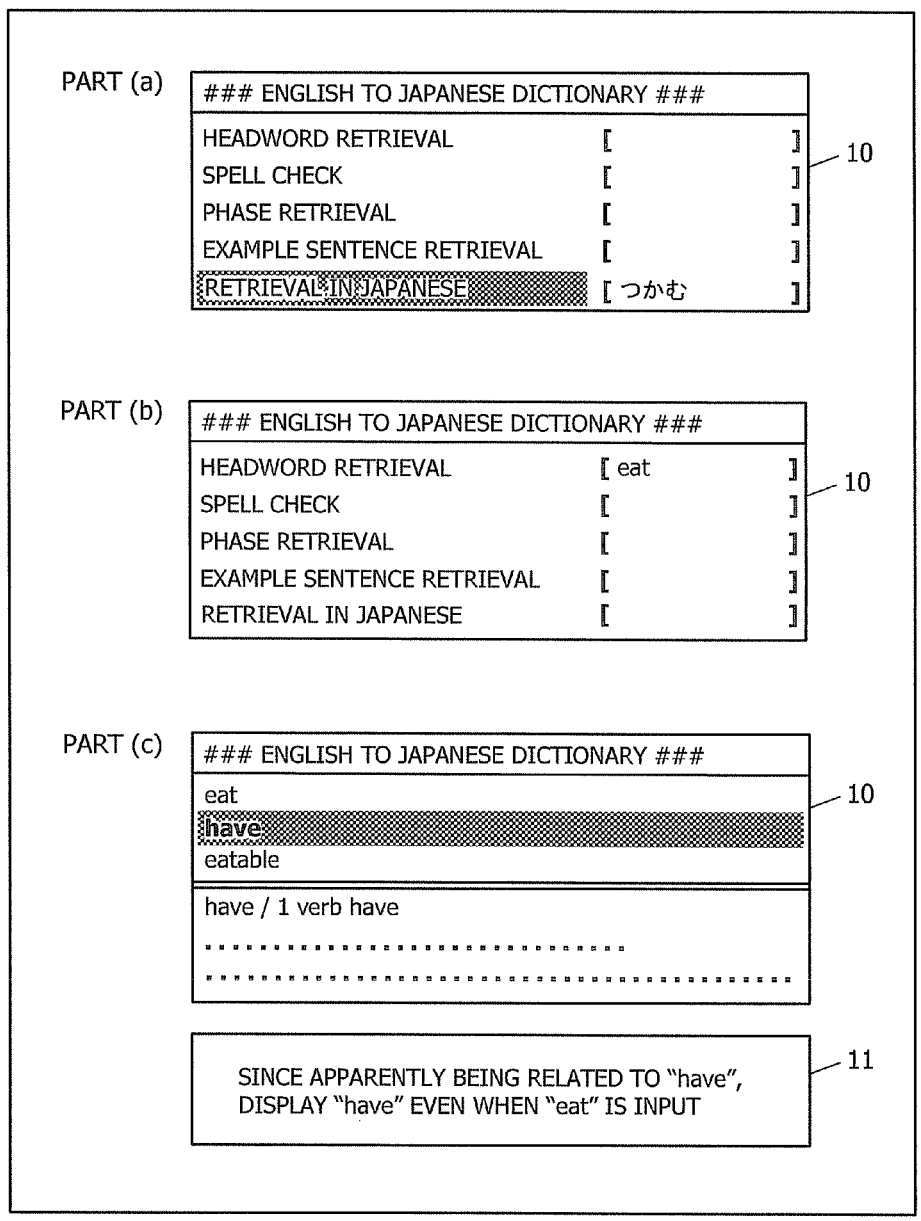
FIG. 11 shows display contents of the display unit.

In the state shown in PART (b) of FIG. 11, when the user does not select the input frame for a Japanese search string but selects the input frame for inputting an English search string (Step T4; YES), and inputs an English search string "eat" therein (Step T5), headwords "eat", "eatable", and the like corresponding to the search string "eat" are retrieved from the dictionary database 820*a* of the English to Japanese dictionary. In addition, a headword "have" correlated with a keyword "eat" corresponding to the search string "eat", shown in the second row of PART (c) of FIG. 3, is retrieved from headwords registered in the keyword registration table 84 (Step T7) by being judged that there is an English keyword which is correlated with the dictionary database 820*a* of the English to Japanese dictionary and registered in the keyword registration table 84 (Step T6; YES).

As shown in PART (c) of FIG. 11, the retrieved headwords "eat", "eatable", "have", and the like are displayed as a headword list on the main-display 10 (Step T8). More specifically, the headword "eat" which completely agrees with the search string is displayed at the top of the headword list among the headwords "eat", "eatable", and the like retrieved from the dictionary database 820*a* of the English to Japanese dictionary, and the headword "have" retrieved from the keyword registration table 84 is displayed immediately under the headword "eat", which completely agrees with the search string, in the headword list. In addition, at the time, the headword "have" retrieved from the keyword registration table 84 is displayed in boldface type so as to be distinguishable in the headword list.

When the user specifies the headword "have" in the headword list through the cursor keys 2*e* (Step T9; YES), the comment "since apparently being related to 'have', . . . " which is correlated with the specified headword "have" and registered in the keyword registration table 84 is displayed on the sub-display 11 (Step T11).

Figure 12:
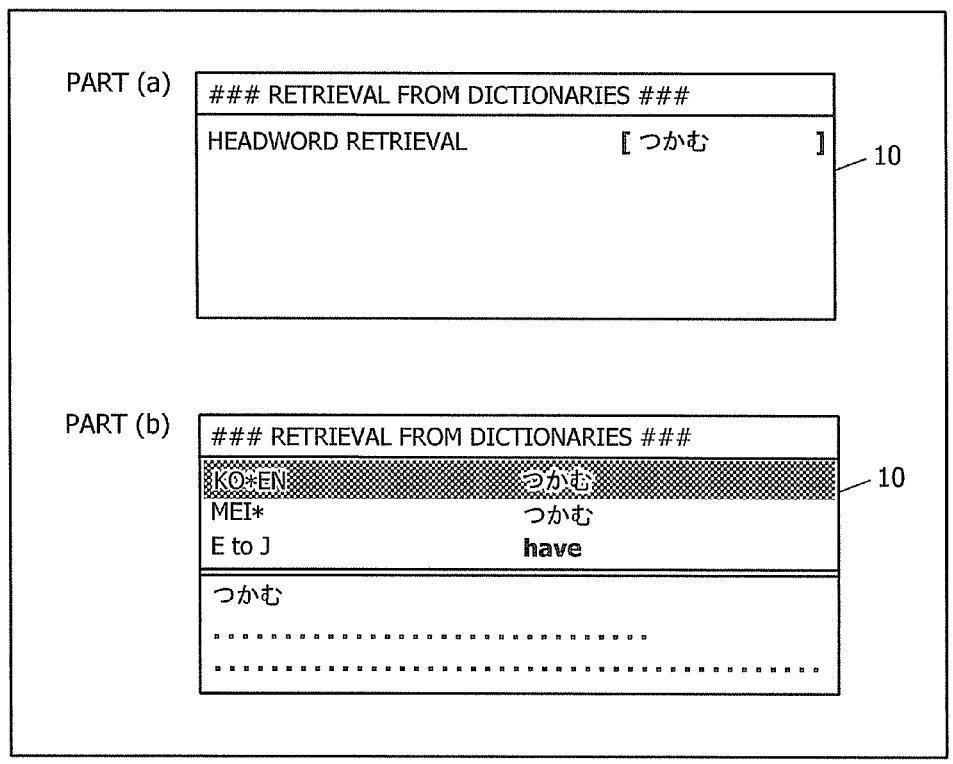
FIG. 12 shows display contents of the display unit.

As shown in PART (a) of FIG. 12, when the user selects the Japanese-related dictionaries (dictionaries which are retrievable in Japanese such as the dictionary database 820*b* of "Ko*en" (Japanese dictionary) and the dictionary database 820*c* of "Mei* Japanese Dictionary") as the search area at the time (Step S4; YES), and inputs a Japanese search string "つかむ (つかむ (tsukamu))" (Step V5), it is judged that a Japanese keyword "つかむ (つかむ (tsukamu))" is correlated with the dictionary database 820*a* of the English to Japanese dictionary of the dictionary/encyclopedia database set 82, and registered in the keyword registration table 84 (Step V6; YES).

Next, headwords "つかむ (つかむ (tsukamu))" and the like corresponding to the search string "つかむ (つかむ (tsukamu))" are retrieved from each of the dictionaries which are retrievable in Japanese such as the dictionary databases 820*b* and 820*c*. In addition, a headword "have" correlated with a keyword "つかむ (つかむ (tsukamu))" which corresponds to the search string "つかむ (つかむ (tsukamu))" is retrieved from among headwords registered in the keyword registration table 84 (Step V7) as shown in the third row of PART (c) of FIG. 3.

Then, as shown in PART (b) of FIG. 12, the retrieved headwords "つかむ (つかむ (tsukamu))", "have", and the like are displayed as a headword list on the main-display 10 (Step V8). More specifically, the headwords "つかむ (つかむ (tsukamu))" and the like retrieved from the dictionary databases 820 are correlated with the title of each of the databases 820 from which each of the headwords is retrieved so as to be displayed, the displayed title being "Ko*en" or "Mei*" as shown in PART (b) of FIG. 12. Also, the headword "have" retrieved from the keyword registration table 84 is correlated with the title of the dictionary which is correlated with the headword "have" and registered in the key registration table 84 so as to be displayed, the displayed title being "E to J" as shown in PART (b) of FIG. 12. At the time, the headword "つかむ (tsukamu)" which completely agrees with the search string is displayed at the top of the headword list among the headwords "つかむ (tsukamu)" and the like retrieved from the dictionary databases 820*b* and 820*c* of the Japanese dictionaries, and the headword "have" retrieved from the keyword registration table 84 is displayed immediately under the headword "つかむ (tsukamu)", which completely agrees with the search string, in the headword list. In addition, at the time, the headword "have" retrieved from the keyword registration table 84 is displayed in boldface type so as to be distinguishable in the headword list.

Second Embodiment of Operation

First, as shown in PART (a) of FIG. 13, when a user selects the encyclopedia database 820*d* of the ceremonial occasion encyclopedia as the search area (Step S6; YES), the category selection screen for selecting a large category from among large categories including "coming-of-age" and "marriage" is displayed on the main-display 10 (Step W1).

When the user selects a large category "manner" through the category selection screen (Step W6; YES), medium categories "basic rules of etiquette" and the like of the selected large category "manner" are displayed on the main-display 10 in a list form (Step W7). When the user selects the medium category "basic rules of etiquette", small categories "姿勢について (about posture)" and the like of the selected medium category "basic rules of etiquette" are displayed on the main display 10 as shown in PART (b) of FIG. 13.

When the user selects the small category "姿勢について (about posture)" (Step W8), the explanation information of the selected small category "姿勢について (about posture)" is read from the encyclopedia database 820d, and displayed on the main-display 10 (Step W9) as shown in PART (c) of FIG. 13. At the time, the keyword registration button 111 is displayed on the sub-display 11.

When, as shown in PART (d) and PART (e) of FIG. 13, the user selects the Japanese keyword input (Step U1; YES, Step U5; YES), and inputs a Japanese keyword "しせい (姿勢 ; shisei)" on the touch panel 110 of the sub-display 11 by handwriting (Step U6), the inputted keyword "しせい (姿勢 ; shisei)" and its language type "Japanese" are correlated with the title "ceremonial occasion encyclopedia" of the encyclopedia database 820d, which is the search area, and the small category "姿勢について (about posture)", and registered in the keyword registration table 84 (Step U7), as shown in the fourth row of PART (c) of FIG. 3.

Figure 14:
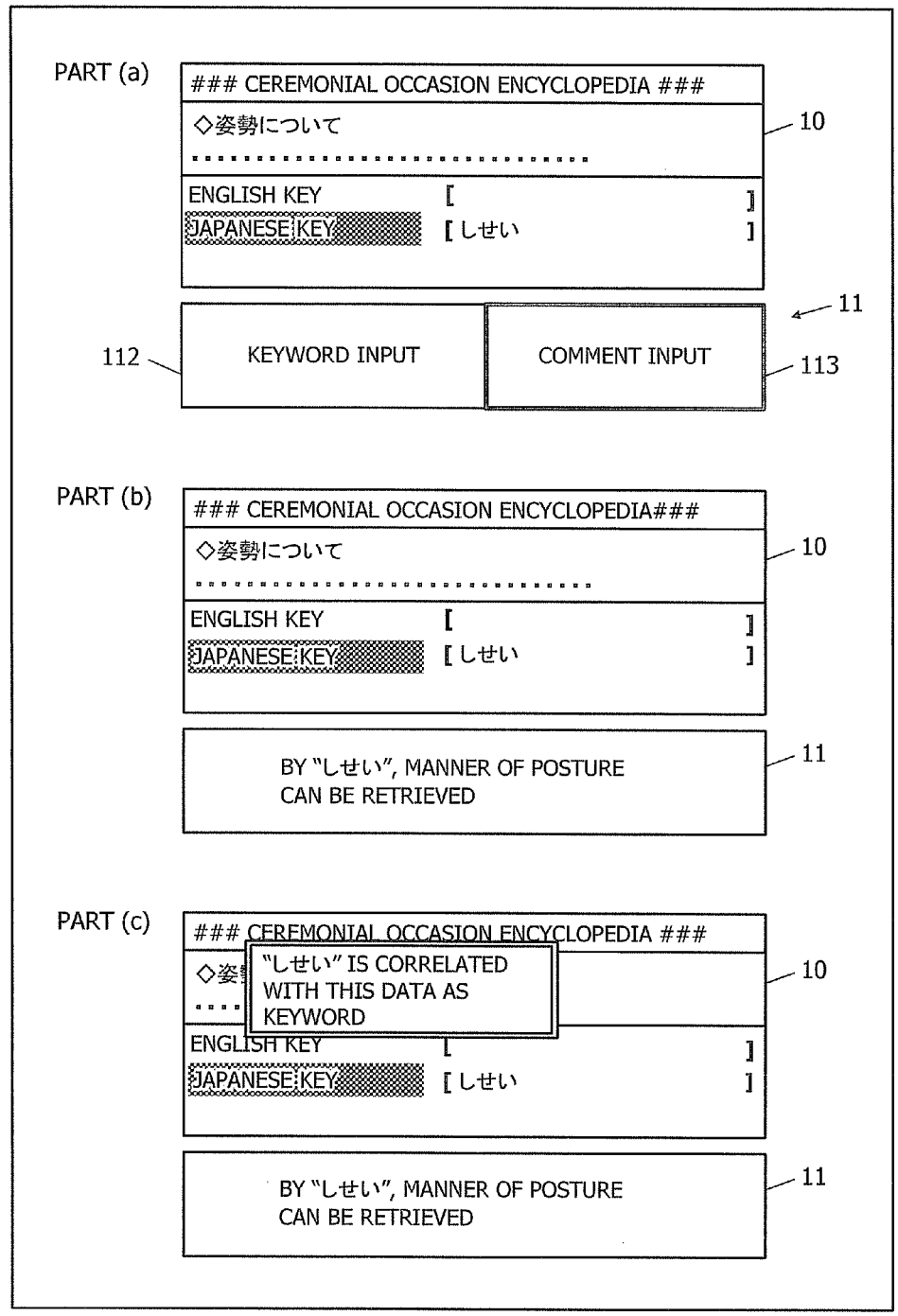
FIG. 14 shows display contents of the display unit.

When, as shown in PART (a) to PART (c) of FIG. 14, the user selects the comment input (Step U1; NO, Step U8; YES), selects the keyword "しせい (姿勢 ; shisei)" from a list of keywords which are correlated with the small category "姿勢について (about posture)" and registered in the keyword registration table 84, the small category whose explanation information is displayed (Step U10), and inputs a comment "by "しせい (姿勢 ; shisei)', manner of posture can . . . ", the comment which is to be attached, on the sub-display 11 by handwriting (Step U11), the inputted comment "by "しせい (姿勢 ; shisei)', manner of posture can . . . " is correlated with the selected keyword "しせい (姿勢 ; shisei)", the title "ceremonial occasion encyclopedia" of the encyclopedia database 820d, and the small category "姿勢について (about posture)", and registered in the keyword registration table 84 (Step U12).

Figure 15:
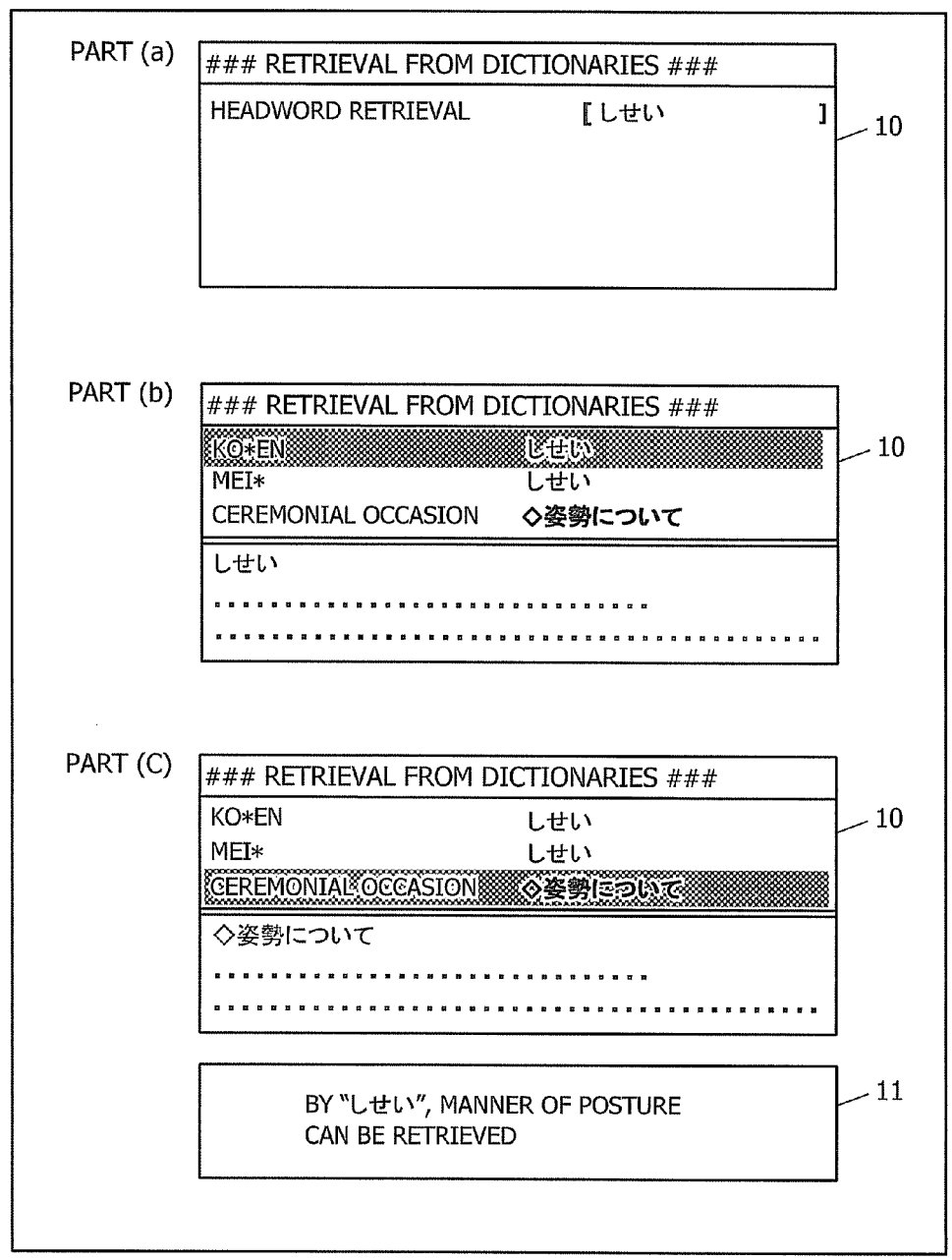
FIG. 15 shows display contents of the display unit.

As shown in PART (a) of FIG. 15, when the user selects the Japanese-related dictionaries as the search area (Step S4; YES), and inputs a Japanese search string "しせい (姿勢 ; shisei)" (Step V5), it is judged that a Japanese keyword "しせい (姿 勢 ; shisei)" is correlated with the encyclopedia database 820d of the dictionary/encyclopedia database set 82, and registered in the keyword registration table 84 (Step V6; YES).

Next, headwords "しせい (姿勢 ; shisei)" and the like corresponding to the search string "しせい (姿勢 ; shisei)" are retrieved from each of the Japanese-related dictionaries such as the dictionary databases 820b and 820c. In addition, a small category "姿勢について (about posture)" correlated with a keyword "しせい (姿勢 ; shisei)" which corresponds to the search string "し せい(姿勢 ; shisei)" is retrieved from small categories registered in the keyword registration table 84 (Step V7) as shown in the fourth row of PART (c) of FIG. 3.

Then, as shown in PART (b) of FIG. 15, the retrieved headwords (and small categories) "しせい (姿勢 ; shisei)", "姿勢について (about posture)", and the like are displayed as a headword list on the main-display 10 (Step V8). More specifically, the headwords "しせい (姿勢 ; shisei)" and the like retrieved from the dictionary databases 820 are correlated with the title of each of the databases 820 from which each of the headwords is retrieved so as to be displayed, the displayed title being "Ko*en" or "Mei*" as shown in PART (b) of FIG. 15. Also, the small category "姿勢について (about posture)" retrieved from the keyword registration table 84 is correlated with the title of the encyclopedia which is correlated with the small category "姿勢について (about posture)" and registered in the key registration table 84 so as to be displayed, the displayed title being "Ceremonial Occasion". At the time, the headwords "しせい (姿勢 ; shisei)" which completely agree with the search string are displayed at the top of the headword list among the headwords "しせい (姿勢 ; shisei)" and the like retrieved from the dictionary databases 820b and 820c of the Japanese dictionaries, and the small category "姿勢について (about posture)" retrieved from the keyword registration table 84 is displayed immediately under the headwords "しせい (姿勢 ; shisei)", which completely agrees with the search string, in the headword list. In addition, at the time, the small category "姿勢について (about posture)" retrieved from the keyword registration table 84 is displayed in boldface type so as to be distinguishable in the headword list.

When the user specifies the small category "姿勢について (about posture)" in the headword list through the cursor keys 2e (Step T9; YES), the comment by "しせい (姿勢 ; shisei)', manner of posture can . . . ", which is correlated with the specified small category "姿勢について (about posture)" and registered in the keyword registration table 84, is displayed on the sub-display 11 (Step T11) as shown in PART (c) of FIG. 15.

Figure 16:
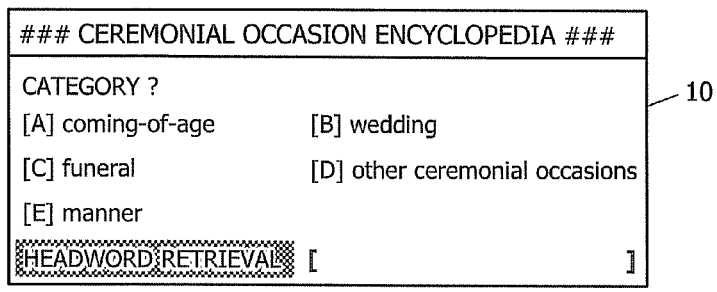
FIG. 16 shows display contents of the display unit.
Figure 17:
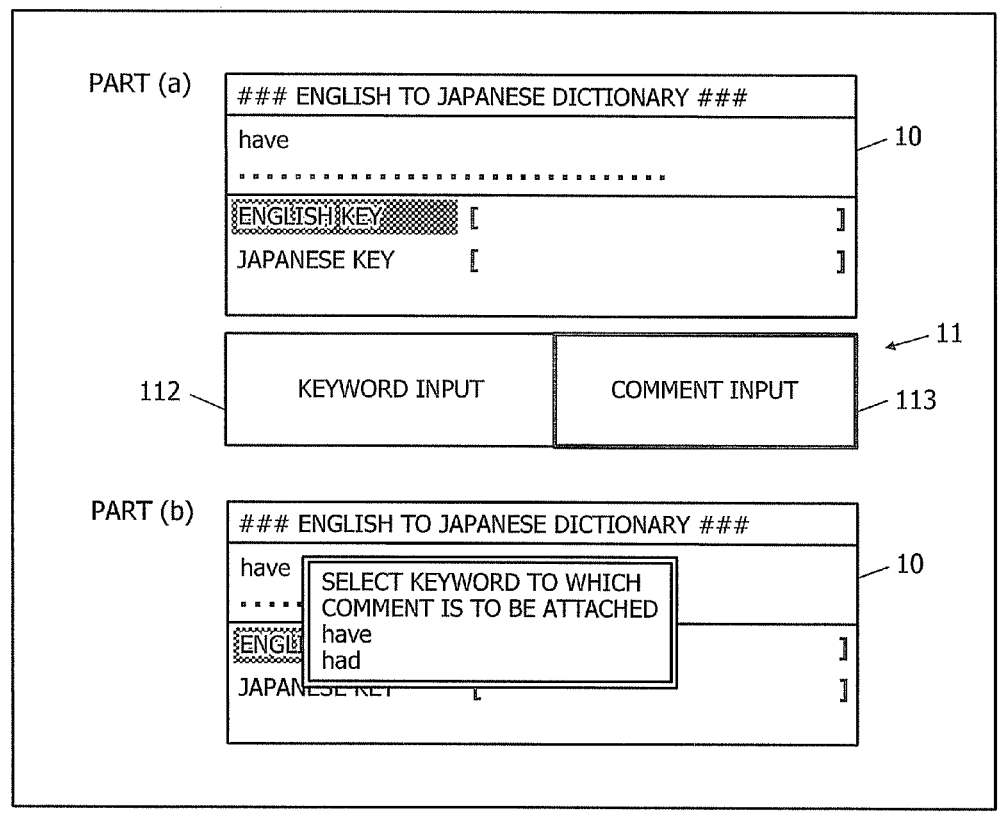
FIG. 17 shows display contents of the display unit.

When the user re-selects the encyclopedia database 820d of the ceremonial occasion encyclopedia as the search area (Step S6; YES), the category selection screen for selecting a large category from large categories including "coming-of-age" and "marriage" is displayed on the main-display 10 (Step W1) as shown in FIG. 16. At the time, the input frame for inputting a search string in order to retrieve a small category in a language type of Japanese is displayed in the category selection screen (Step W3) by being judged that a Japanese keyword "し し ; shisei)" is correlated with the encyclopedia database 820d of the ceremonial occasion encyclopedia and registered in the keyword registration table 84 (Step W2; YES).

When the user selects the input frame for Japanese, and selects category retrieval in Japanese (Step W12; YES), a Japanese search string can be inputted in the selected input frame (Step W13).

Third Embodiment of Operation

In a state where a keyword "have" is correlated with a headword "have" of the dictionary database 820a of the English to Japanese dictionary by default and a user adds a keyword "had" to the headword "have", when the user selects the dictionary database 820a of the English to Japanese dictionary as the search area (Step S2; YES) as shown in PART (a) of FIG. 17, and the explanation information of the headword "have" is read from the dictionary database 820a of the English to Japanese dictionary and displayed on the main-display 10 (Step T13), the keyword registration button 111 is displayed on the sub-display 11.

When the user selects the comment input (Step U1; NO, Step U8; YES), the keywords "have" and "had" which are correlated with the headword "have" and registered in the key registration table 84 are displayed on the main-display 10 in a list form, the headword whose explanation information is displayed (Step U9) as shown in PART (b) of FIG. 17.

When the user selects a keyword from the keywords (Step U10), and inputs a comment to be attached to the headword (Step U11), the inputted comment is correlated with the selected keyword, the title "English to Japanese Dictionary" of the dictionary database 820a, and the headword "have", and registered in the keyword registration table 84 (Step U12).

By the electronic dictionary 1 described above, as shown in Steps T7 and T8 of FIG. 5, Steps V7 and V8 of FIG. 6, PART (c) of FIG. 11, PART (b) of FIG. 12, and the like, when headwords corresponding to an inputted search string are retrieved from the dictionary storage unit, the retrieved headwords are displayed as a headword list, and the explanation information of a headword which is selected based on a user operation from among the headwords in the headword list is read from dictionary information and displayed. Then, when a keyword which is inputted based on a user operation is correlated with the headword and registered in the keyword registration table 84, the headword whose explanation information is displayed, and the search string is inputted thereafter, the headword correlated with the keyword corresponding to the search string is retrieved from headwords registered in the keyword registration table 84, and added to the headword list so as to be displayed. Accordingly, even when what keyword is attached to what headword cannot be remembered, a keyword corresponding to the search string is detected, and a headword correlated with the keyword and registered in the keyword registration table 84 is retrieved, and added to the headword list to be displayed. As a result, retrieval of a headword to which a keyword is attached can be performed in addition to the standard headword search without being aware that a keyword is attached to a retrieval-target headword. Therefore, retrieval of a headword to which a user attaches a keyword can be performed efficiently.

As shown in Step T8 of FIG. 5, Step V8 of FIG. 6, PART (c) of FIG. 11, PART (b) of FIG. 12, and the like, since a headword correlated with a keyword and registered in the keyword registration table 84 is displayed so as to be distinguishable in a headword list, the headword correlated with a keyword which corresponds to a search string and registered in the keyword registration table 84 can be distinguished from headwords retrieved from the dictionary databases 820. Consequently, a headword correlated with a keyword and registered in the keyword registration table 84 can be easily selected from a headword list so that the explanation information of the selected headword is displayed. Therefore, retrieval of a headword to which a keyword is attached can be performed more efficiently.

As shown in Step T11 of FIG. 5, Step V11 of FIG. 6, PART (c) of FIG. 11, and the like, when a headword correlated with a keyword and registered in the keyword registration table 84 is specified in a headword list by a user operation, a comment correlated with the specified headword and registered in the keyword registration table 84 is displayed on the sub-display 11. Consequently, it can be easily understood why a user attaches a keyword to a headword.

As shown in Step T3 of FIG. 5, PART (a) of FIG. 11, and the like, an input frame for a language type of headwords stored in a dictionary database 820 is displayed in the input screen. In addition, when a keyword is registered in a language type which is different from a language type of the headwords stored in the dictionary database 820, an input frame for the language type of the keyword is also displayed. Therefore, when a keyword is registered in a language type which is different from a language type of headwords, retrieval of a headword can be performed in the language type of the keyword.

As shown in Steps W3, W5, and W12 to W23 of FIG. 7, FIG. 16, and the like, when a keyword is correlated with a category of the encyclopedia database 820d and registered in the keyword registration table 84, an input frame for the language type of the keyword is displayed on the category selection screen. When a search string is inputted in the input frame of the category selection screen in the language type corresponding to the input frame based on a user operation, retrieval of a category, which is correlated with a keyword corresponding to the search string and registered in the keyword registration table 84, from categories registered in the keyword registration table 84 is performed, and the explanation information of the category is read from the encyclopedia database 820d and displayed. Therefore, even in the case of the encyclopedia database 820d from which a category cannot be retrieved by inputting a search string, retrieval of a category corresponding to a keyword can be performed.

As shown in Step T8 of FIG. 5, Step V8 of FIG. 6, PART (c) of FIG. 11, PART (b) of FIG. 12, and the like, a headword which completely agrees with a search string is displayed at the top of a headword list among retrieved headwords, and a headword which is correlated with a keyword corresponding to the search string and registered in the keyword registration table 84 is displayed immediately under the headword which completely agrees with the search string, in the headword list. Consequently, a headword correlated with a keyword and registered in the keyword registration table 84 can be easily selected from a headword list so that the explanation information of the selected headword is displayed. Therefore, retrieval of the explanation information of a headword to which a keyword is attached can be performed more efficiently.

The present invention is not limited to the embodiments described above, and can be appropriately modified without departing from the scope of the present invention.

For example, the information display program 81 in the present invention may be stored in a memory card, a CD, or the like, which is attachable to and removable from the electronic dictionary 1.

Furthermore, the various operations performed by a user to the electronic dictionary 1 may be performed by using other keys which are different from the keys described above.

Japanese Patent Application No. 2009-225736 filed on Sep. 30, 2009, the entire disclosure of which, including the description, claims, drawings, and abstract, is incorporated herein by reference in its entirety.

What is claimed is:

1. An electronic dictionary comprising:
a dictionary database configured to store dictionary information in which a plurality of headwords in a first language type and a plurality of explanation information are correlated with each other, respectively;
a non-transitory computer-readable memory configured to store computer-executable units; and
a processor, communicatively coupled to the memory, that facilitates execution of the computer-executable units, wherein the computer-executable units comprise:
a first input frame display control unit configured to display a first input frame for the first language type via a display unit;
an input unit configured to input, based on a user operation, a first search string in the first language type into the first input frame;
an information display control unit configured to:
retrieve a headword, of the plurality of headwords, corresponding to the first search string in the first language type inputted by the input unit; and display, via the display unit, the explanation information correlated with the retrieved headword by reading the dictionary information from the dictionary database;
a keyword registration unit configured to register a keyword in the first language type and/or a second language type different from the first language type to link with the headword stored in the dictionary database in response to a user operation;
a language type judgment unit configured to judge whether at least one of the keyword registered by the keyword registration unit is in the second language type;
a second input frame add-and-display control unit configured to add and display a second input frame for the second language type when the language type judgment unit judges that at least one of the keyword registered by the keyword registration unit is in the second language type, wherein the second input frame and the first input frame are concurrently displayed via the display unit; and
an input frame selection unit configured to select the first input frame or the second input frame based on a user operation;
wherein the input unit inputs a second search string in the second language type into the second input frame based on a user operation when the input frame selection unit selects the second input frame; and
wherein the information display control unit:
further retrieves the headword that is linked to a keyword including the second search string in the second language type inputted by the input unit; and
displays, via a display unit, the explanation information correlated with the retrieved headword by reading the dictionary information from the dictionary database.

2. The electronic dictionary according to claim 1,
wherein the input unit inputs the first search string in the first language type into the first input frame based on a user operation when the input frame selection unit selects the first input frame; and
wherein the information display control unit:
further retrieves the headword corresponding to the first search string input by the input unit and the headword linked to a keyword including the first search string in the first language type; and
displays, via the display unit, the explanation information correlated with the retrieved headwords by reading the dictionary information from the dictionary database; and
wherein the information display control unit further distinguishably displays, of the retrieved headwords, the headword that is linked to the keyword.

3. The electronic dictionary according to claim 2,
wherein the keyword registration unit further registers a comment which is inputted based on a user operation to be correlated with the headword that is linked to a keyword, and
wherein the information display control unit further displays the comment when the headword having the comment is specified in the headword list based on a user operation.

4. The electronic dictionary according to claim 2,
wherein the information display control unit displays an exact headword which completely agrees with the search string among the retrieved headwords at a top of the headword list displayed, and
wherein the information display control unit displays the retrieved headword that is linked to the keyword including search string just after the exact headword in the headword list.

5. The electronic dictionary according to claim 1 further comprising:
an encyclopedia database configured to store encyclopedia information in which a plurality of categories and a plurality of explanation information are correlated with each other, respectively;
wherein the computer executable units further comprise:
a dictionary selector unit configured to select one of the dictionary database and the encyclopedia database as a search area based on a user operation;
a category selection screen display unit configured to display a category selection screen for selecting a category from the encyclopedia database, when the encyclopedia database is selected as the search area by the dictionary selector; and
an explanation information display control unit configured to:
read explanation information for the category selected based on a user operation through the category selection screen from the encyclopedia database; and
display the read explanation information;
wherein the keyword registration unit registers a keyword inputted by a user to link with the category whose explanation information is displayed,
wherein, when a keyword is linked to a category by the keyword registration unit, the category selection screen display unit further displays an third input frame which corresponds to a language type of the linked keyword in the category selection screen,
wherein the input unit inputs a search string into the third input frame in the category selection screen based on a user operation, and
wherein the explanation information display control unit:
retrieves the category that is linked to a keyword corresponding to the search string when the search string is inputted into the third input frame by the input unit;
reads explanation information of the retrieved category from the encyclopedia database; and
displays the read explanation information.

6. A non-transitory computer-readable storage medium having a program stored thereon for controlling a control unit of an electronic dictionary, wherein the program controls the control unit to function as:
a dictionary database configured to store dictionary information in which a plurality of headwords in a first language type and a plurality of explanation information are correlated with each other, respectively;
a first input frame display control unit configured to display a first input frame for the first language type;
an input unit configured to input a first search string in the first language type into the first input frame based on a user operation;
an information display control unit configured to:
retrieve a headword corresponding to the first search string in the first language type inputted by the input unit; and
display the explanation information correlated with the retrieved headword by reading the dictionary information from the dictionary database;
a keyword registration unit configured to register a keyword in the first language type and/or a second language type different from the first language type to link with the headword stored in the dictionary database in response to a user operation; and a language type judgment unit configured to judge whether at least one of the keyword registered by the keyword registration unit is in the second language type;

a second input frame add-and-display control unit configured to add and display a second input frame for the second language type when the language type judgment unit judges that at least one of the keyword registered by the keyword registration unit is in the second language type; and an input frame selection unit configured to select the first input frame or the second input frame based on a user operations;

wherein the input unit inputs a second search string in the second language type into the second input frame based on a user operation when the input frame selection unit selects the second input frame; and wherein the information display control unit:
    further retrieves the headword that is linked to a keyword including the second search string in the second language type inputted by the input unit; and
    displays the explanation information correlated with the retrieved headword by reading the dictionary information from the dictionary database.

* * * * *